(12) United States Patent
DeGlopper et al.

(10) Patent No.: US 11,537,657 B2
(45) Date of Patent: Dec. 27, 2022

(54) SYSTEMS, METHODS, AND COMPUTER-READABLE PRODUCTS FOR TRACK SELECTION

(71) Applicant: SPOTIFY AB, Stockholm (SE)

(72) Inventors: Peter DeGlopper, Stockholm (SE); David P. Rodger, Arlington, MA (US); Matthew S. Ogle, New York, NY (US)

(73) Assignee: Spotify AB, Stockholm (SE)

( * ) Notice: Subject to any disclaimer, the term of this patent is extended or adjusted under 35 U.S.C. 154(b) by 25 days.

(21) Appl. No.: 17/111,711

(22) Filed: Dec. 4, 2020

(65) Prior Publication Data

US 2021/0089573 A1    Mar. 25, 2021

Related U.S. Application Data

(63) Continuation of application No. 15/389,758, filed on Dec. 23, 2016, now Pat. No. 10,860,646.
(Continued)

(51) Int. Cl.
*G06F 17/00* (2019.01)
*G06F 7/00* (2006.01)
(Continued)

(52) U.S. Cl.
CPC ............ *G06F 16/639* (2019.01); *G06F 16/60* (2019.01); *G06F 16/635* (2019.01); *G06F 16/68* (2019.01);
(Continued)

(58) Field of Classification Search
CPC ........ G06F 16/639; G06F 16/60; G06F 16/68; G06F 16/683; G06F 16/635; G06Q 30/0201; G06Q 30/0282; G06Q 50/01
(Continued)

(56) References Cited

U.S. PATENT DOCUMENTS 5,918,303 A   6/1999  Yamaura
6,031,797 A   2/2000  Van Ryzin
(Continued)

FOREIGN PATENT DOCUMENTS

EP   2161668 A1   3/2010
EP   2207348      7/2010
(Continued)

OTHER PUBLICATIONS

Int'l Search Report and Written Opinion from Int'l Appln. No. PCT/IB2017/001091, dated Dec. 14, 2017.
(Continued)

*Primary Examiner* — Pavan Mamillapalli
(74) *Attorney, Agent, or Firm* — Merchant & Gould P.C.

(57) ABSTRACT

Methods, apparatuses, and computer-readable products for selecting tracks. A plurality of request parameters are received from a client device. Based on those request parameters, plurality of bans, history track attributes, and artist identifiers are loaded from a database. A most recent discovery track is calculated based on the plurality of histories and the plurality of artist identifiers. An artist identifier is repeatedly selected from the plurality of artist identifiers along with a track type from a set of track types until a predetermined number of artist identifier and track type pairs have been selected. A plurality of candidate tracks for each selected artist identifier are loaded from a database. One track of the plurality of candidate tracks is repeatedly selected for each artist identifier and track type pair until one track has been selected for each pair of the predetermined number of artist identifier and track type pairs. The predetermined number of tracks that have been selected are returned to the client device.

15 Claims, 19 Drawing Sheets

Related U.S. Application Data

(60) Provisional application No. 62/376,468, filed on Aug. 18, 2016.

(51) Int. Cl.
*G06F 16/638* (2019.01)
*G06F 16/635* (2019.01)
*G06F 16/683* (2019.01)
*G06Q 50/00* (2012.01)
*G06Q 30/02* (2012.01)
*G06F 16/60* (2019.01)
*G06F 16/68* (2019.01)

(52) U.S. Cl.
CPC ....... *G06F 16/683* (2019.01); *G06Q 30/0201* (2013.01); *G06Q 30/0282* (2013.01); *G06Q 50/01* (2013.01)

(58) Field of Classification Search
USPC ......................................................... 707/723
See application file for complete search history.

(56) References Cited

U.S. PATENT DOCUMENTS

| | | |
|---|---|---|
| 6,697,800 B1 | 2/2004 | Jannink |
| 6,933,433 B1 | 8/2005 | Porteus |
| 7,296,031 B1 | 11/2007 | Platt |
| 7,398,274 B2 | 7/2008 | Ittycheriah et al. |
| 7,627,605 B1 | 12/2009 | Lamere et al. |
| 7,668,825 B2 | 2/2010 | Vogel et al. |
| 7,678,984 B1 | 3/2010 | Lamere |
| 7,680,824 B2 | 3/2010 | Plastina |
| 7,734,630 B2 | 6/2010 | Kato |
| 7,765,166 B2 | 7/2010 | Beringer et al. |
| 7,769,760 B2 | 8/2010 | Watanabe et al. |
| 7,797,446 B2 | 9/2010 | Heller et al. |
| 7,849,092 B2 | 12/2010 | Slaney et al. |
| 8,005,724 B2 | 8/2011 | Dunning |
| 8,041,666 B2 | 10/2011 | Vossen et al. |
| 8,175,989 B1 | 5/2012 | Gopinath |
| 8,189,963 B2 | 5/2012 | Li et al. |
| 8,306,976 B2 | 11/2012 | Handman et al. |
| 8,335,578 B2 | 12/2012 | Ijichi et al. |
| 8,341,527 B2 | 12/2012 | Gupte |
| 8,370,351 B2 | 2/2013 | Kalasapur et al. |
| 8,468,046 B2 | 6/2013 | Harbick et al. |
| 8,473,368 B2 | 6/2013 | Gronow et al. |
| 8,544,050 B2 | 9/2013 | Brown et al. |
| 8,549,017 B2 | 10/2013 | Saito et al. |
| 8,868,481 B2 | 10/2014 | Wei et al. |
| 8,874,574 B2 | 10/2014 | Purdy |
| 8,972,418 B2 | 3/2015 | Panchadsaram |
| 8,983,888 B2 | 3/2015 | Nice et al. |
| 9,110,955 B1 | 8/2015 | Bernhardsson |
| 9,111,519 B1 | 8/2015 | Yang et al. |
| 9,122,747 B2 | 9/2015 | Inagaki |
| 9,158,754 B2 | 10/2015 | Whitman et al. |
| 9,355,174 B2 | 5/2016 | Moss et al. |
| 9,369,514 B2 | 6/2016 | Bernhardsson et al. |
| 9,406,072 B2 | 8/2016 | Whitman |
| 9,451,329 B2 | 9/2016 | Whitman et al. |
| 9,547,679 B2 | 1/2017 | Whitman |
| 9,747,009 B2 | 8/2017 | Jadhav |
| 9,959,012 B2 | 5/2018 | Rivera |
| 10,219,027 B1 | 2/2019 | O'Neill |
| 10,860,646 B2 | 12/2020 | DeGlopper |
| 2003/0236582 A1* | 12/2003 | Zamir ................. G11B 27/34 |
| 2004/0225519 A1* | 11/2004 | Martin ................ G11B 27/002 705/53 |
| 2005/0021470 A1* | 1/2005 | Martin ................. G11B 27/11 |
| 2006/0032363 A1 | 2/2006 | Platt |
| 2006/0212442 A1 | 9/2006 | Conrad |
| 2007/0008830 A1 | 1/2007 | Tsukazaki |
| 2008/0022845 A1 | 1/2008 | Chung |
| 2008/0162570 A1 | 7/2008 | Kindig |
| 2009/0013260 A1* | 1/2009 | Martin ............... H04N 21/4667 |
| 2009/0034750 A1 | 2/2009 | Ayoub et al. |
| 2009/0217804 A1 | 9/2009 | Lu |
| 2010/0076982 A1 | 3/2010 | Gates |
| 2010/0076983 A1 | 3/2010 | Gates |
| 2010/0162115 A1 | 6/2010 | Ringewald |
| 2010/0185671 A1* | 7/2010 | Burba .................. G06F 16/637 707/780 |
| 2011/0153663 A1 | 6/2011 | Koren et al. |
| 2011/0213769 A1 | 9/2011 | Handman et al. |
| 2011/0295843 A1 | 12/2011 | Ingrassia, Jr. |
| 2012/0036981 A1 | 2/2012 | Hyman |
| 2012/0059788 A1 | 3/2012 | Sekino |
| 2012/0166436 A1 | 6/2012 | Kalasapur |
| 2012/0271882 A1 | 10/2012 | Sachdeva |
| 2012/0278342 A1 | 11/2012 | Purdy |
| 2012/0290621 A1 | 11/2012 | Heitz, III |
| 2013/0110848 A1* | 5/2013 | Svendsen ............. G06F 16/435 707/748 |
| 2013/0262471 A1 | 10/2013 | Whitman et al. |
| 2013/0311163 A1 | 11/2013 | Somekh et al. |
| 2014/0129500 A1 | 5/2014 | Nice |
| 2014/0214751 A1 | 7/2014 | Damera-Venkata |
| 2014/0237361 A1 | 8/2014 | Martin |
| 2014/0279756 A1 | 9/2014 | Whitman |
| 2014/0279817 A1 | 9/2014 | Whitman et al. |
| 2014/0280181 A1 | 9/2014 | Rodger et al. |
| 2015/0248618 A1 | 9/2015 | Johnson |
| 2016/0285937 A1 | 9/2016 | Whitman et al. |
| 2016/0328409 A1 | 11/2016 | Ogle et al. |

FOREIGN PATENT DOCUMENTS

| | | |
|---|---|---|
| EP | 2312516 | 4/2011 |
| EP | 2439653 A1 | 4/2012 |
| WO | 2012107762 | 8/2012 |

OTHER PUBLICATIONS

Extended European Search Report from corresponding European Pat. Appln. No. 17186075.2, dated Jan. 25, 2018.
Adomavicius, et al., "Toward the Next Generation of Recommender Systems: A Survey of the State-of-the-Art and Possible Extensions," IEEE, Transactions on Knowledge and Data Engineering, vol. 17, No. 6, pp. 734-749, Jun. 2005.
Google, "Word2Vec," https://code.google.com/p/word2vec (last visited Nov. 11, 2015).
Dato, GraphLab CreateTM API—Factorization Recommender (https://dato.com/products/create/docs/generated/graphlab.recommender.factorization_recommender.FactorizationRecommender.html) (last visited Feb. 2, 2016).
ISR & WO—International Search Report and Written Opinion of the International Searching Authority, PCT/US2014/029324, dated Mar. 31, 2016.
ISR & WO—International Search Report and Written Opinion of the International Searching Authority, PCT/US2014/059650, dated Feb. 13, 2015.
ISR & WO—International Search Report and Written Opinion of the International Searching Authority, PCT/US2016/042821, dated Aug. 31, 2016.
S. Rendle, "Factorization Machines," Data Mining (ICDM), 2010 IEEE 1oth International Conference on, pp. 995-1000 (Dec. 13, 2010), http://www.csie.ntu.edu.tw/~b97053/paper/Rendle201 0FM.pdf.
Scikit-Learn Developers, "Scikit Implementation" (http://scikit-learn.org/stable/modules/linear_model.html#logistic-regression) (last visited Feb. 2, 2016).
The Echo Nesttm, "Acoustic Attributes Overview," http://developer.echonest.com/acoustic-attributes.html (last visited Feb. 2, 2016).
Collaborative Filtering. Wikipedia. N.p., n.d. Web. Jul. 18, 2015. <https://en.wikipedia.org/wiki/Collaborative_filtering>.
Koren, Yehuda, Robert Bell, and Chris Volinsky. "Matrix Factorization Techniques for Recommender Systems." Computer 8 (2009): 42-49 Web. Jul. 18, 2015.

(56) References Cited

OTHER PUBLICATIONS

Johnson, Christopher C. "Logistic Matrix Factorization for Implicit Feedback Data." NIPS. Web. Jul. 18, 2015. <http://stanford.edu/~rezab/nips2014workshop/submits/logmat.pdf>.

Hu et al., "Collaborative Filtering for Implicit Feedback Datasets", Data Mining 2008, ICDM Eighth IEEE International Conference on Dec. 15-19, 2008, pp. 263-272.

O'Mahony et al., "Detecting noise in recommender system databases", Proceeding IUI 06 Proceeding of the 11th International conference on intelligent user interfaces, Sydney, Australia, Jan. 29-Feb. 1, 2006, pp. 109-115.

Brinkman, Martin, "Hide YouTube video authors from recommended and suggestions—gHacks Tech News", Jan. 29, 2015, retrieved from the internet: https://www.ghacks.net/2012/12/17/hide-youtube-video-authors-from-recommended-and-suggestions/, 6 pages.

European Communication pursuant to Article 94(3) EPC, in Application 17186075.2, dated Dec. 18, 2018, 7 pgs.

European Summons to attend oral proceedings in Application 17186075.2, dated Jun. 7, 2021, 9 pgs.

PCT International Preliminary Reporton Patentability in Application PCT/IB2017/001091, dated Feb. 28, 2019, 8 pages.

\* cited by examiner

| Playlist 203 | | | | |
|---|---|---|---|---|
| Index ($I_D$) 220 | Track ID 222 | Artist ID 224 | Track Type 226 | Artist Type 228 |
| 1 | | | | |
| 2 | | | | |
| 3 | | | | |
| ⋮ | ⋮ | ⋮ | ⋮ | ⋮ |
| N-1 | | | | |
| N | | | | |

FIG. 3

| User Request ||
|---|---|
| User ID | User_1_ID |
| Cluster ID(s) | Cluster_1_ID<br>Cluster_2_ID |
| History Track Index ($I_{HT}$) | |
| 1 | Track_ID_3212 |
| 2 | Track_ID_437 |
| ... | ... |
| n | Track_ID_456 |

FIG. 4

CLUSTER_X_ID

| | | | Song | Weight | Song | Rank |
|---|---|---|---|---|---|---|
| Seed Artist #1 | $W_{SA1}$ | | $S_1$ | $W_{S1}$ | $S_4$ | 1 |
| | | | $S_2$ | $W_{S2}$ | $S_5$ | 2 |
| | | | $S_3$ | $W_{S3}$ | $S_6$ | 3 |
| | | | Song | Weight | Song | Rank |
| Seed Artist #2 | $W_{SA2}$ | | $S_1$ | $W_{S1}$ | $S_4$ | 1 |
| | | | $S_2$ | $W_{S2}$ | $S_5$ | 2 |
| | | | $S_3$ | $W_{S3}$ | $S_6$ | 3 |

| | | | Song | Rank |
|---|---|---|---|---|
| Similar Artist #1 | 1 | | $S_4$ | 1 |
| | | | $S_5$ | 2 |
| | | | $S_6$ | 3 |
| | | | Song | Rank |
| Similar Artist #2 | 2 | | $S_4$ | 1 |
| | | | $S_5$ | 2 |
| | | | $S_6$ | 3 |

FIG. 5

| Bans Database | | |
|---|---|---|
| User ID | Scope | Track/ Artist ID |
| User_1_ID | Song | Track_ID_591 |
| User_1_ID | Song | Track_ID_1045 |
| User_1_ID | Song | Track_ID_2356 |
| User_1_ID | Artist | Track_ID_3223 |

FIG. 8

Track Attribute Database 210

| Track ID 702 | Main Artist ID 704 | Categories 706 | All Artist IDs 708 | Duration 710 | Song ID 712 | Title 714 |
|---|---|---|---|---|---|---|
| Track_ID_001 | Artist_ID_001 | Studio, Electric, Vocal | Artist_ID_001 Artist_ID_498 | XXXXXX ms | Song_ID_001 | XXXXXX |
| ... | ... | ... | ... | ... | ... | ... |
| Track_ID_020 | Artist_ID_002 | Studio, Electric, Vocal | Artist_ID_002 | XXXXXX ms | Song_ID_020 | XXXXXX |
| ... | ... | ... | ... | ... | ... | ... |
| Track_ID_437 | Artist_ID_054 | Studio, Electric, Vocal | Artist_ID_054 | XXXXXX ms | Song_ID_437 | XXXXXX |
| ... | ... | ... | ... | ... | ... | ... |
| Track_ID_591 | Artist_ID_018 | Acoustic, Studio, Vocal | Artist_ID_018 | XXXXXX ms | Song_ID_591 | XXXXXX |
| Track_ID_601 | Artist_ID_018 | Studio, Electric, Vocal | Artist_ID_018 | XXXXXX ms | Song_ID_601 | XXXXXX |
| ... | ... | ... | ... | ... | ... | ... |
| Track_ID_1045 | Artist_ID_018 | Studio, Electric, Vocal | Artist_ID_018 | XXXXXX ms | Song_ID_1045 | XXXXXX |
| Track_ID_2356 | Artist_ID_018 | Studio, Electric, Vocal | Artist_ID_018 | XXXXXX ms | Song_ID_2356 | XXXXXX |
| ... | ... | ... | ... | ... | ... | ... |
| Track_ID_3212 | Artist_ID_003 | Studio, Electric, Vocal | Artist_ID_003 Artist_ID_1043 | XXXXXX ms | Song_ID_3212 | XXXXXX |
| ... | ... | ... | ... | ... | ... | ... |
| Track_ID_3223 | Artist_ID_003 | Studio, Electric, Vocal | Artist_ID_003 Artist_ID_452 | XXXXXX ms | Song_ID_3223 | XXXXXX |

FIG. 9

SYSTEMS, METHODS, AND COMPUTER-READABLE PRODUCTS FOR TRACK SELECTION

CROSS REFERENCE TO RELATED APPLICATION

This application is a continuation of U.S. application Ser. No. 15/389,758, filed on Dec. 23, 2016, which claims priority to U.S. Provisional Application No. 62/376,468 filed Aug. 18, 2016, the contents of which are incorporated herein by reference. To the extent appropriate, a claim of priority is made to each of the above disclosed applications.

BACKGROUND OF THE INVENTION

Field of the Invention

The present invention relates to a technical solution for generating a streaming content playlist that includes content that is both familiar and unfamiliar to the user.

Related Art

Service providers that stream content to their customers have become a major component of the entertainment industry. These service providers can stream content to a user for a fraction of the price of what it would cost the user to purchase copies of it, giving users the opportunity to access a practically limitless amount of content. Having access to massive catalogs of content, however, raises two potential problems. First, users do not want to sort through all the available content and generate their own playlists. Nowadays users expect the service provider to generate the playlist for them or provide recommendations. This leads to the second problem. The service provider must determine what to include in a playlist. If the user receives only content with which they are familiar (e.g., a song from an album they own), they may consider the content boring and tire of the streaming service. If, however, users do not receive any content they are familiar with, they may eventually become desirous of such content and cease subscribing to the streaming service, preferring instead to return to their personal media collection. Accordingly, it is desirable to generate a playlist that delivers the right balance of familiar content and unfamiliar content, such that the user's desires to hear familiar content and to explore new content are both met.

BRIEF DESCRIPTION

The present invention provides methods, apparatuses, and computer readable products for track selection.

In one embodiment, a method for selecting a plurality of tracks is provided. A plurality of request parameters are received from a client device. Based on those request parameters, a plurality of bans, history track attributes, and artist identifiers are loaded from a database. A most recent discovery track is calculated based on the plurality of history track attributes and the plurality of artist identifiers. An artist identifier is repeatedly selected from the plurality of artist identifiers along with a track type from a set of track types until a predetermined number of artist identifier and track type pairs have been selected. A plurality of candidate tracks for each selected artist identifier are loaded from a database. One track of the plurality of candidate tracks is repeatedly selected for each artist identifier and track type pair until one track has been selected for each pair of the predetermined number of artist identifier and track type pairs. The predetermined number of tracks that have been selected are returned to the client device.

In another embodiment, a method for selecting a plurality of tracks is provided. For each chosen artist a track from the target song set type is chosen, excluding tracks that either (1) have been chosen within a specified number of tracks, (2) share a title with a track chosen within a specified number of tracks, (3) have been previously banned, or (4) that are from a collaboration of artists that has been previously banned, or any combination of (1), (2), (3) or (4).

In yet another embodiment, a system for selecting a plurality of tracks is provided. The system includes at least one processor configured to receive, from a client device, a plurality of request parameters. The processor is further configured to load, from a database, based on the request parameters: a plurality of bans, a plurality of history track attributes, and a plurality of artist identifiers; and calculate a most recent discovery track based on the plurality of history track attributes and the plurality of artist identifiers. The processor is also configured to repeatedly select a selected artist identifier from the plurality of artist identifiers and a track type from a set of track types until a predetermined number of artist identifier and track type pairs have been selected. The processor is configured to load, from the database, a plurality of candidate tracks for each selected artist identifier, and repeatedly select one track of the plurality of candidate tracks for each artist identifier and track type pair until one track has been selected for each pair of the predetermined number of artist identifier and track type pairs. The processor is further configured to return, to the client device, the predetermined number of tracks that have been selected.

In a further embodiment, a system for selecting a plurality of track sets is provided. The system includes at least one processor configured to, until a specified number of artists has been chosen: choose an artist set, a track set type, and an artist from the artist set, exclude either (1) one or more artists that have been chosen within a specified number of tracks or (2) one or more banned artists, or (3) a combination of both (1) and (2), where the artist set is determined based on a number of tracks selected since a last artist was selected from that artist set, and return a list of chosen track sets.

In a still further embodiment, a system for selecting a plurality of tracks is provided. The system includes at least one processor configured, for each chosen artist choose a track from the target track set type, excluding tracks that either (1) have been chosen within a specified number of tracks, (2) share a title with a track chosen within a specified number of tracks, (3) have been previously banned, or (4) that are from a collaboration of artists that has been previously banned, or any combination of (1), (2), (3) or (4).

BRIEF DESCRIPTION OF THE DRAWINGS

The features and advantages of the present invention will become more apparent from the detailed description set forth below when taken in conjunction with the following drawings.

FIG. 3 illustrates the different fields in a playlist.
FIG. 4 is an illustration of the contents of a user request.
FIG. 5 is an illustration of a cluster.

FIG. 8 is an illustration of the contents of a bans database.

FIG. 9 is an illustration of the contents of a track attribute database.

DETAILED DESCRIPTION

Overview

The example embodiments presented herein are directed to systems, methods, and computer-readable products for track selection. This is for convenience only, and is not intended to limit the application of the present invention. In fact, after reading the following description, it will be apparent to one skilled in the relevant art how to implement the following invention in alternative embodiments, involving other forms of media content, for example, television or movies.

Figure 1:
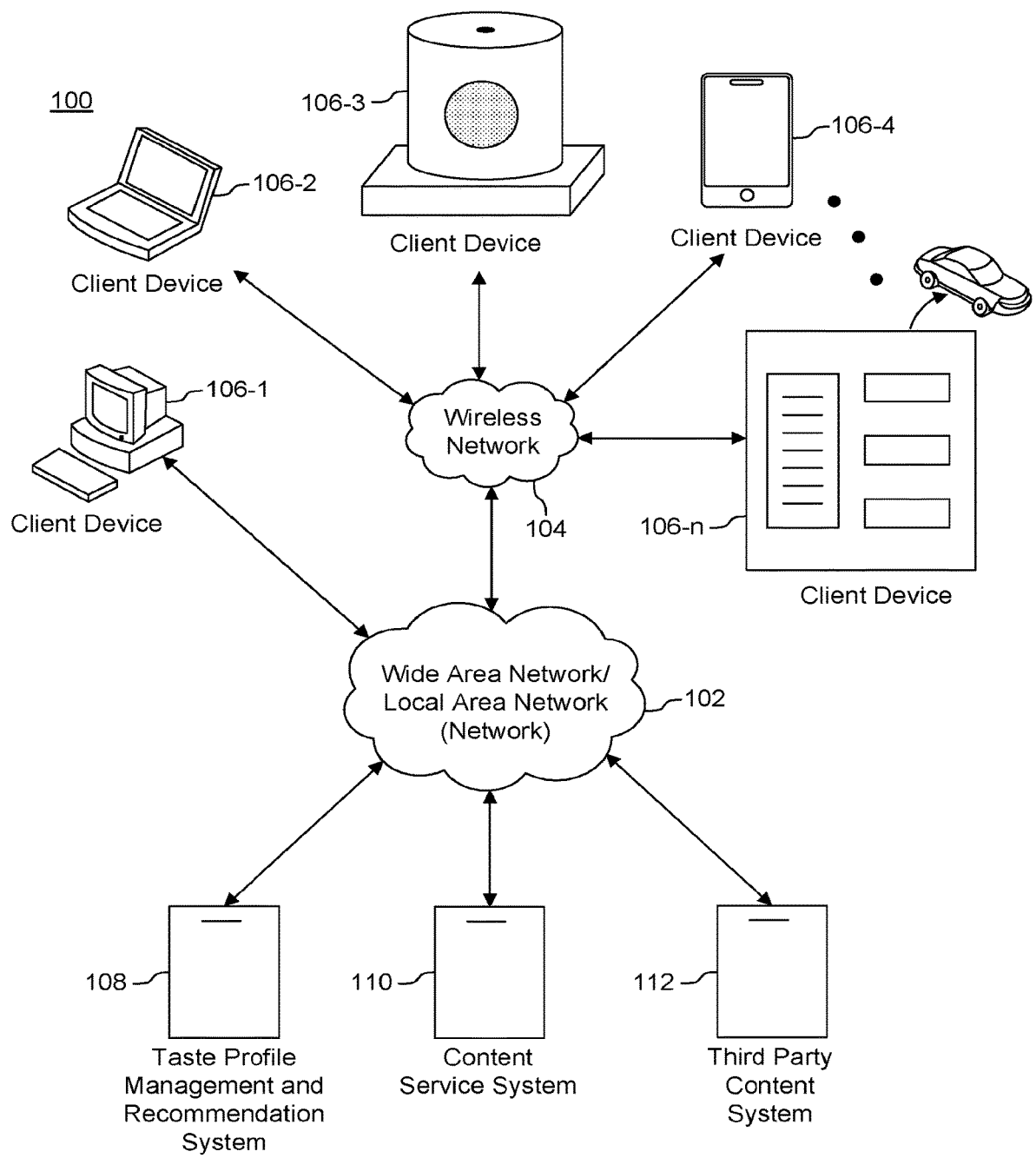
FIG. 1 is an overview of a physical environment for streaming media content.

FIG. 1 is a representative view of a system 100 in which some embodiments of the invention may be implemented. Not all of the components are required to practice the invention, and variations in the arrangement and type of the components may be made without departing from the spirit or scope of the invention. System 100 particularly is an environment constructed to automatically collect large quantities of user activity data and media content data and to generate playlists.

System 100 of FIG. 1 includes wide area networks/local area networks ("LANs/WANs")-(network) 102, wireless network 104, client devices 106-1, 106-2, 106-3, 106-4, . . . , 106-n (referred to collectively and individually as client device 106), a taste profile and recommendation management system (TPMRS) 108, a content service system 110 and one or more third party content systems 112.

Wireless network 104 is configured to communicatively couple client devices 106 and their components with network 102. Wireless network 104 may include any of a variety of wireless sub-networks that may further overlay stand-alone ad-hoc networks, and the like, to provide an infrastructure-oriented connection for client devices 106. Such sub-networks may include mesh networks, wireless LAN (WLAN) networks, cellular networks, and the like. Other now or future known types of access points can be used in place of network 102 and wireless network 104.

Generally, the TPMRS 108 operates to manage taste profiles, generate recommendations, collect user activity, train models, provide recommendations and/or generate playlists. Content service system 112 operates to provide content to client devices 106 according to the playlists generated by the TPMRS 108. In various embodiments, such content may include, but is not limited to media content such as music, podcast, video, games, books and the like, as well as webpage content, advertisements, professionally generated content (non-UGC content), search results, blogs, and/or any of a variety of user generated content for access by another client device. In an example embodiment, the TPMRS 108 generates playlists which contain lists of media objects that are used to retrieve corresponding content from content service system 110.

Figure 2:
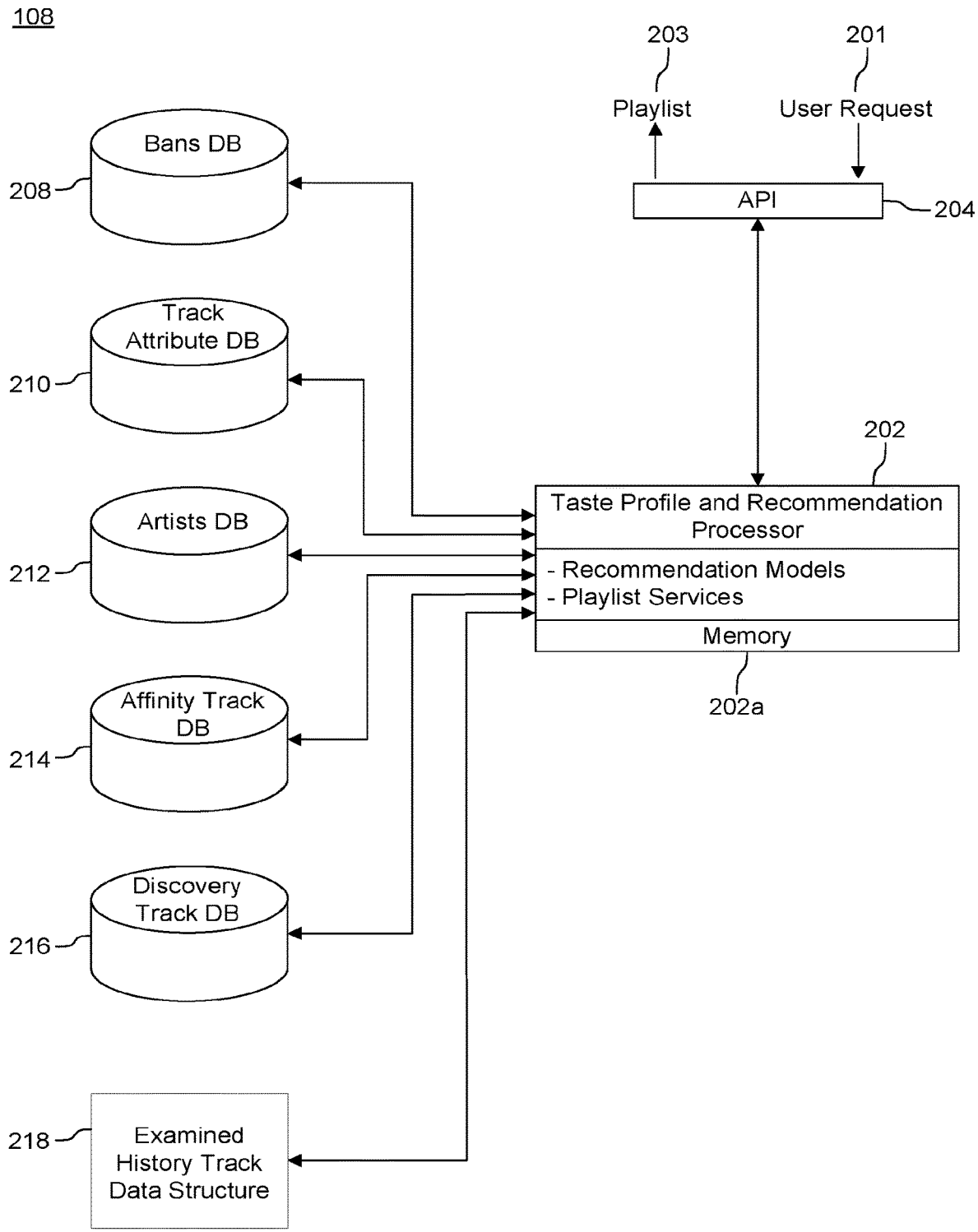
FIG. 2 is an illustration of the communications within a taste profile and recommendation management system.

FIG. 2 is a representative view of a TPMRS 108 according to one embodiment. TPMRS 108 includes an application programming interface (API) 204 that allows a client device (e.g., any of client devices 106-1 . . . 106-n) to receive or transmit information. API 204 may present a user interface to the client device 106 or interact with a client device 106 to receive input and display output. For example, API 204 may receive a user request 201.

Figure 3:
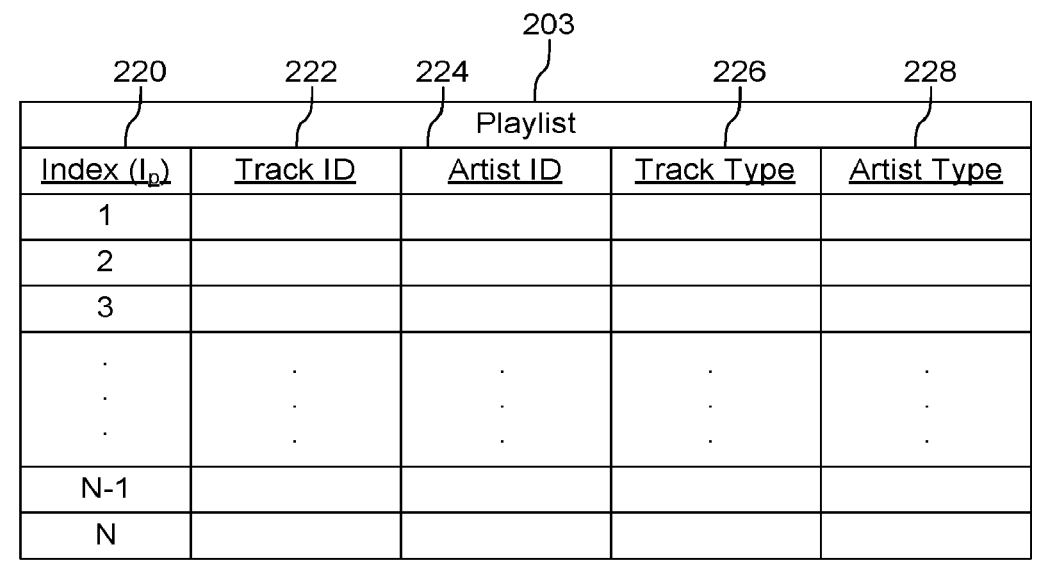

TPMRS 108 includes a taste profile and recommendation processor TPRP 202 (which may be embodied in one or more physical processors) that controls generation of a playlist 203, as described below. The structure of the playlist 203 generated by the TPRP 202 is shown in FIG. 3. FIG. 3 shows an exemplary unpopulated playlist. Each position in the playlist 203 is defined by a playlist index 220 ($I_P$) which defines the order in which tracks are played. In general, an index is a numeric list, the values of which define an order. For example, $I_P$=1 is the first position in the playlist 203 and a track at this index value (position) is played first. $I_P$=N is the last position in the playlist 203 and a track at this index value (position) is played last. For each index value, there is track identifier (ID) information 222, artist ID information 224, track type information 226, and artist type information 228 associated with that index value. Some or all of this information may be presented on a display of a client device 106. Track IDs are listed in the track ID information 222 and identify a track to be played. In one embodiment, the track IDs may be an alphanumeric string of characters preferably in hexadecimal form, but may be in another form as well. Artist IDs are listed in the artist ID information 224 and identify an artist of the track to be played. Like the track IDs, the artist IDs may be an alphanumeric string of characters preferably in hexadecimal form, but may also be in another form. Each track may be labelled as a discovery track or a familiar track (as discussed below) and information regarding the same is the track type information 226. Like the track IDs and the artist IDs, the track type information 226 may be in the form of an alphanumeric string. However, since there are only two possible states, a conditional flag approach may be used, where a "1" or "0" may be used to represent the two states. One advantage of this approach is that less memory is required to store the information. Similarly, each artist may be labelled as a seed artist or a similar (sim) artist and information regarding the same is artist type information 228. Similar to the track type information 226, the artist type information may be stored as an alphanumeric string or using a conditional flag approach. In general, in one embodiment, the TPRP 202 first determines the artist and track type for each position in the playlist, and then proceeds to determine a track for each position in the playlist, as discussed below.

The TPRP 202 is communicatively connected to memory 202a. The TPMRS 108 also includes a plurality of databases, specifically: a ban database 208, a track attribute database 210, an artist information database 212, an affinity database 214, and a discovery track database 216. While these databases are shown as separate databases, one of ordinary skill will appreciate that the databases could be combined into a fewer number, including one database.

FIG. 4 illustrates an example user request 201 and the information contained therein. Each user is assigned a unique user identifier (user ID) 302 when enrolling in the streaming service. The user ID 302 may be an alphanumeric combination. Here, for simplicity, an example user ID 302 has a value of "UseR_1_ID" in FIG. 4.

As discussed above, the TPRP 202 receives a user request 201 for a new playlist. To generate the user request 201, a client device 106 marshals the requisite parameters into the user request 201 and transmits the same to the TPRP 202. Upon receipt, the TPRP 202 unmarshalls the parameters from the user request 201 and calls program code stored, for example, in memory 202a which when executed by the TPRP 202, processes the parameters. Here, the parameters include the user ID 302 and one or more cluster identifiers (IDs) (e.g., 304-1 and 304-2, collectively 304). These cluster ID(s) 304 may be an alphanumeric string that identifies corresponding clusters. An exemplary cluster 300 is shown in FIG. 5. In general, a cluster 300 is one or more sets of weighted or ranked entities. The cluster may be embodied as, for example, a database entry, a spreadsheet, or a data structure. In one embodiment, each cluster includes two sets of artists: a weighted set of seed artists 307 and a ranked set of sim artists 309. In one embodiment, a plurality of representations respectively corresponding to a plurality of clusters may be presented on a client device 106. The representations may be an image, text, or a combination thereof. Moreover, the representations may be selectable via a user input such as, for example, a touchscreen. Based on a selection, the client device 106 may identify the corresponding cluster ID 304 and marshall the same in the user request 201.

A seed artist is an artist on which a playlist may be based. The seed artist may be, for example, an artist selected by a user, an artist whose content has been determined to be listened to more often than other artist content, and the like. Different seed artists may be used to match a musical taste and to generate different types of playlists. For example, Generic Artist #1 (a rock band) may be identified as a seed artist for the purposes of generating a first playlist, and Generic Artist #2 (a jazz singer) may be identified as a seed artist for generating a second playlist. Still further, both Generic Artist #1 and Generic Artist #2 may be identified as seed artists for a desired playlist. A sim artist is an artist which is similar to the seed artist, but not identified as a basis for the playlist. Thus, if Generic Artist #1 is identified as a seed artist, then Generic Artist #37 could be identified as a similar artist.

Each of these sets may, in turn, have one or more sets of weighted or ranked subentities. For instance, each seed artist (in the set of the seed artists 307) may have a weighted set of familiar tracks (e.g., 307-5 and 307-6) and a ranked set of popular tracks (e.g., 307-7 & 307-8). In addition, each related artist may have a ranked set of popular tracks (e.g., 309-5 & 309-6). The weighted set of seed artists 307 in FIG. 5 includes Seed Artist #1 (307-1) and Seed Artist #2 (307-2), with respectively corresponding weights 307-3 and 307-4. The ranked set of similar artists includes Similar Artist #1 (309-1) and Similar Artist #2 (309-2), along with corresponding ranks 309-3 and 309-4. These clusters may vary from user to user and thus the subentities may also vary from user to user.

The user request 201 may also include history track ID information as a parameter in the form of a plurality of history track IDs 303-1, . . . , 303-n corresponding to the last n tracks streamed to one of the client devices 106. The history track IDs may be in the form of an alphanumeric string, preferably in hexadecimal form. A history track index ($I_{HT}$) 305 is also provided which indicates how recently the corresponding track was played, $I_{HT}=1$ being the most recently played track.

Figure 6:
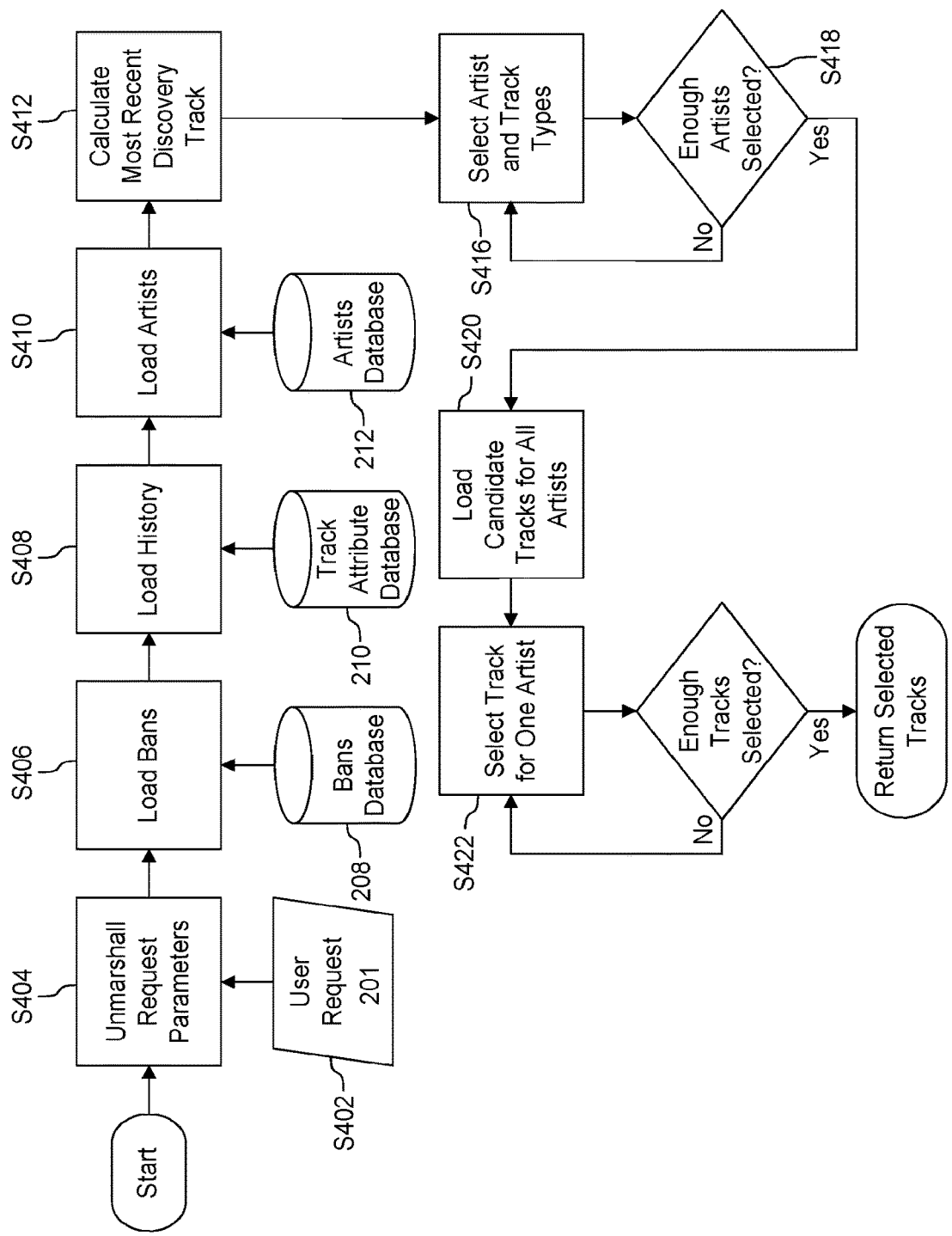
FIG. 6 is a flowchart illustrating the steps in generating a playlist.

FIG. 6 is an overview of an exemplary method of generating a daily mix playlist. The TPMRS 108 receives the user request 201 through API 204 (S402). As discussed, the user request 201 is processed by the TPRP 202 in that the TPRP 202 unmarshalls the received request to access the parameters (S404). The TPRP 202 calls program code stored, in one embodiment, in memory 202a and executes that code. The procedures described herein, and illustrated in the figures, are visual representations of the code executed by the TPRP 202.

Figure 7:
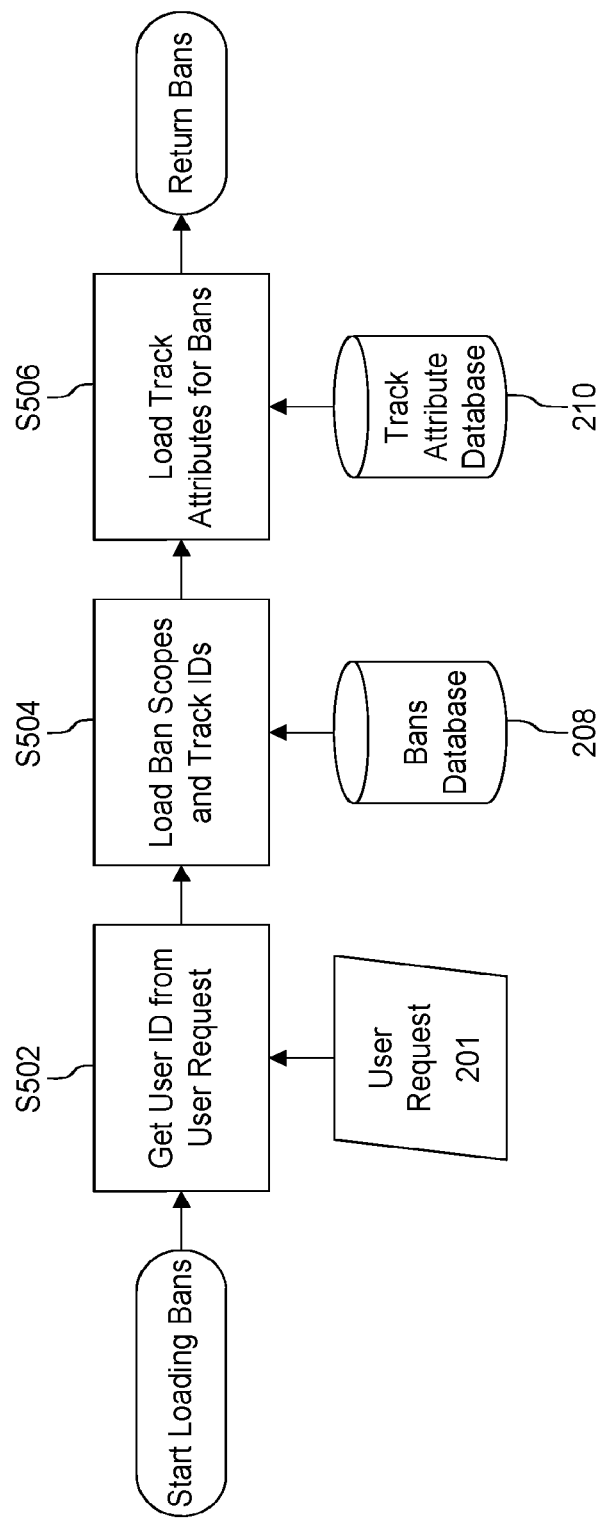
FIG. 7 is a flowchart illustrating the steps in loading banned tracks/artists.

Next a load bans operation (S406) is performed based on information stored in bans database 208, as described below. Features of the load bans operation S406 are shown in greater detail in FIG. 7.

In S502, the user ID 302 is retrieved from the user request 201. Next, in S504, the TPRP 202 loads the ban scope information from the bans database 208. One feature of the streaming content system 100 is that content may be banned (i.e., filtered or blocked) from being streamed in the future. Information regarding a banned track or artist is stored in the bans database 208. Bans database 208 includes a plurality of records respectively corresponding to each ban. For each record, there are three associated fields: user ID 302, ban scope information 602, and track ID 604. Track ID 604 may be used to determine an artist to be banned by reference to the track attribute database 210. For example, if a ban of Track_ID_3223 is received and the scope of the ban is "artist", then TPRP 202 may refer to track attribute database 210 and determine that an artist corresponding to Artis_ID_003 is banned. In another embodiment, TPRP 202 may refer to the all artists ID information and determine that artists with IDs Artist_ID_003 and Artist_ID_452 are banned.

FIG. 8 is illustrative of the information stored in the bans database 208 for user ID 302. The scope of each ban is variable. If only a particular track is banned, other tracks by that artist may still be streamed. If an artist is banned, any track by that artist will be banned. Since there are two possible types of bans (track and artist), the ban scope information 602 can be a conditional flag. For example, if the ban scope is of only a track, a "1" may be stored in the field as the ban scope information 602. If the ban scope is an artist, a "0" may be stored in the field as the ban scope information 602. Alternatively, an alphanumeric character (e.g., "T" and "A") or a string of characters (e.g., "track" and "artist") may be stored in the field as ban scope information 602 to represent a track ban and an artist ban. FIG. 8 shows bans for user ID 302, three of which are track bans (represented by the string "track") and one which is an artist ban (represented by the string "artist"). In S504, the TPRP 202 loads all bans associated with the user ID 302 from the bans database 208 and stores it in memory 202a. Of course, if there is no ban information corresponding to the user ID 302, then no ban information is loaded.

Next, in S506, the TPRP 202 loads track attributes from the track attribute database 210. FIG. 9 is illustrative of information stored in the track attribute database 210. The track attribute database 210 includes the following fields: track ID information 702, main artist ID information 704, categories information 706, all artists ID information 708, duration information 710, song ID information 712, and title information 714 for each track in the streaming library. The track ID information 702 is a list of unique track IDs respectively corresponding to tracks in the streaming library. The track ID information 702 may be a string of alphanumeric characters that identify the track, preferably in hexadecimal form. Similarly, the main artist ID information 704 contains unique artist IDs that respectively correspond to the tracks available in the streaming library. The main artist ID information 704 may be a string of alphanumeric characters, preferably in hexadecimal form. Each track may be labelled with different descriptive labels (e.g., studio, electric, and vocal) and such labels are stored in the track attribute database 210. In a case where the track is a result of a collaboration of multiple artists, the artist IDs for those artists are stored as all artists ID information 708. Thus, the all artists ID information 708 may be a plurality of artist IDs. The duration of each track is stored as duration information 710, and is preferably measured in milliseconds. The song ID information 712 may be a string of alphanumeric characters, preferably in hexadecimal form. Multiple tracks may have the same song ID information, such as different recordings or releases of a song. The title of each track is stored as title information 714, and may be the alphanumeric string of characters that comprise the title.

With respect to loading bans, the relevant fields are the track ID information 702, main artist ID information 704, all artists ID information 708, and song ID information 712. The TPRP 202 uses the track ID information 604 retrieved from the bans database 208 in S504 to determine which tracks/artists are banned and loads the corresponding information (track ID information 702, main artist ID information 704, all artists ID information 708, and song ID information 712) into memory 202*a* (S506). In the case of an artist ban, the track ID information 604 is the ID for an exemplary track for the banned artist.

Figure 10:
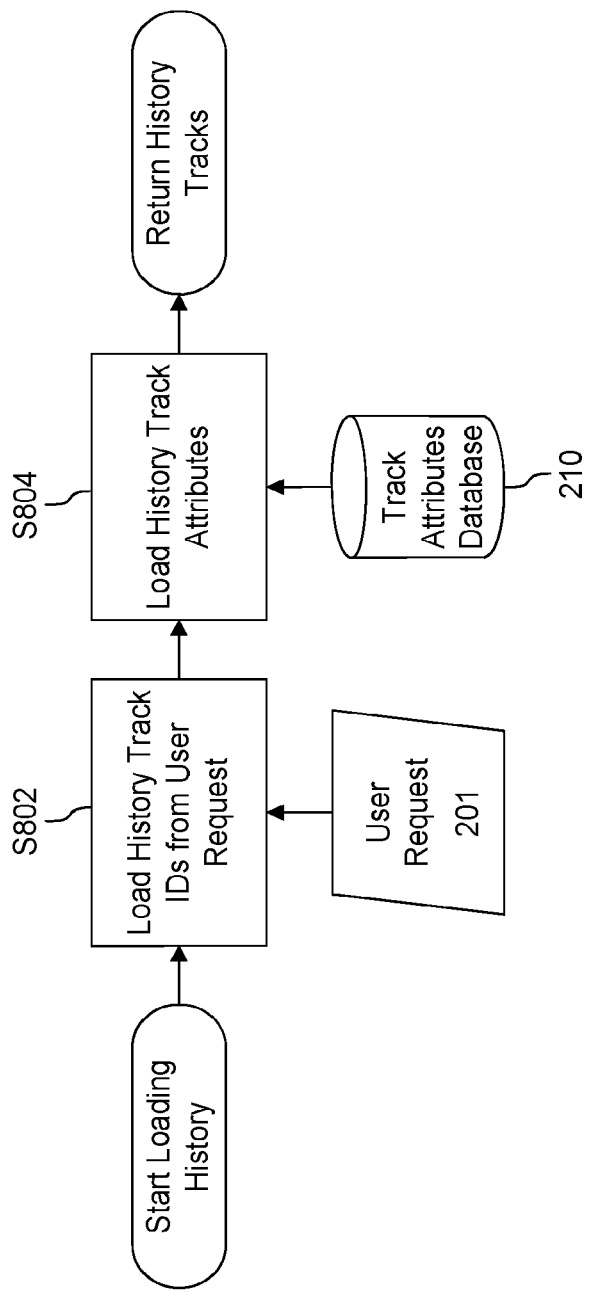
FIG. 10 is a flowchart illustrating the steps in loading history track information.

Returning to FIG. 6, after the TPRP 202 has loaded the track attributes for banned tracks/artists into memory 202*a* in S406, the TPRP 202 may load information on a user's play history (S408) from information contained in the user request 201, if such information is contained in the user request 201. More specifically, one of the parameters that may be included in the user request 201 is the history track IDs. The TPRP 202*a* may unmarshall those history track IDs and load them into memory 202*a* (S802), as shown in FIG. 10. Next, in S804, one or more track attributes stored in track attribute database 210 may be retrieved by the TPRP 202 and stored in memory 202*a*. In an exemplary embodiment, the title information 714, main artist ID information 704, all artists ID information 708, and song ID information 712 for each track corresponding to the history track IDs (303-1 . . . 303-*n*) may be retrieved from track attribute database 210 and stored in memory 202*a* (S804).

Figure 11:
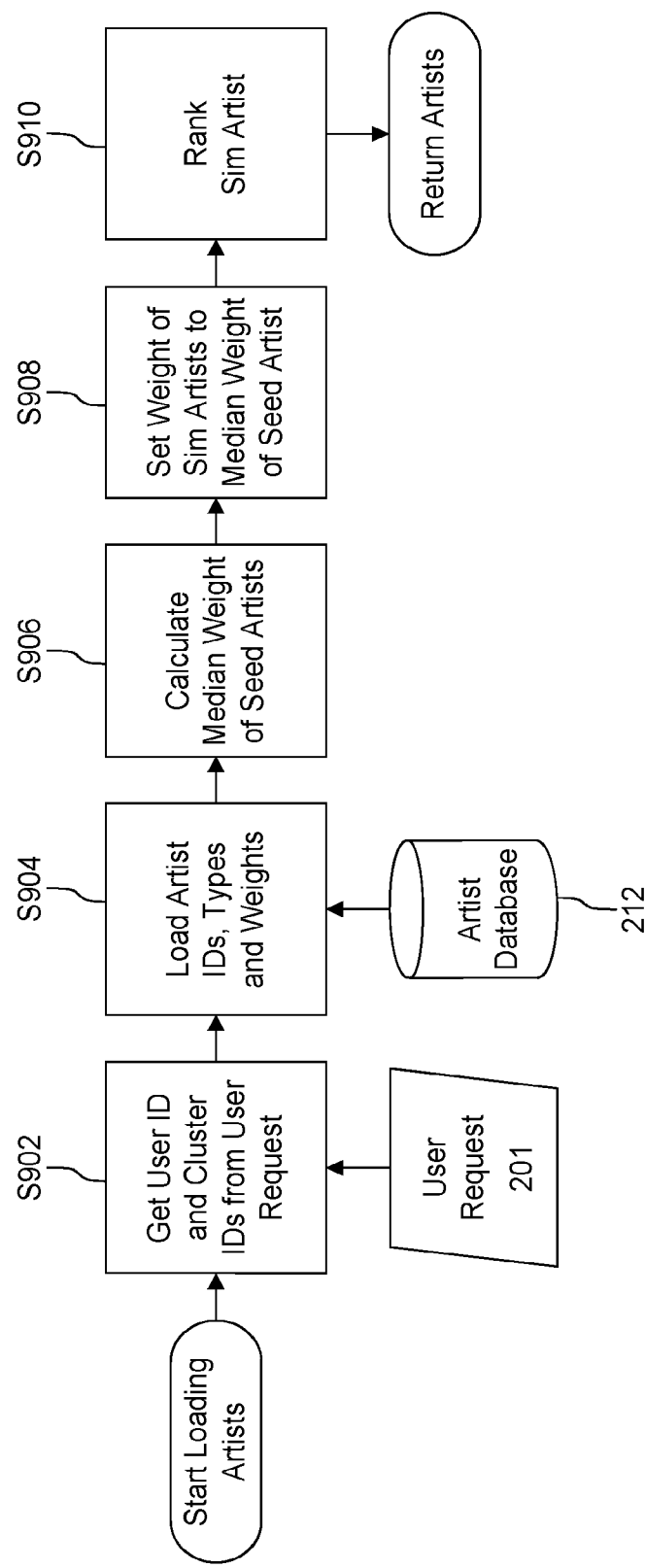
FIG. 11 is a flowchart illustrating the steps in loading possible artists for inclusion in a playlist.

Returning to FIG. 6, the TPRP 202 proceeds to load a list of possible artists for inclusion in the playlist (S410), as further explained with reference to FIG. 11. In S902, the user ID 302 and cluster IDs 304-1 . . . 304-*n* are retrieved from the user request 201. Next, in S902, cluster information (described above with respect to FIG. 5) including artist IDs, types, and weights are loaded from the artist database 212. For each cluster (for each user), the artist database 212 stores a map of seed artist IDs and associated weights along with an ordered list of sim artist IDs. An exemplary artist database 212 is shown in FIG. 12.

Figure 12:
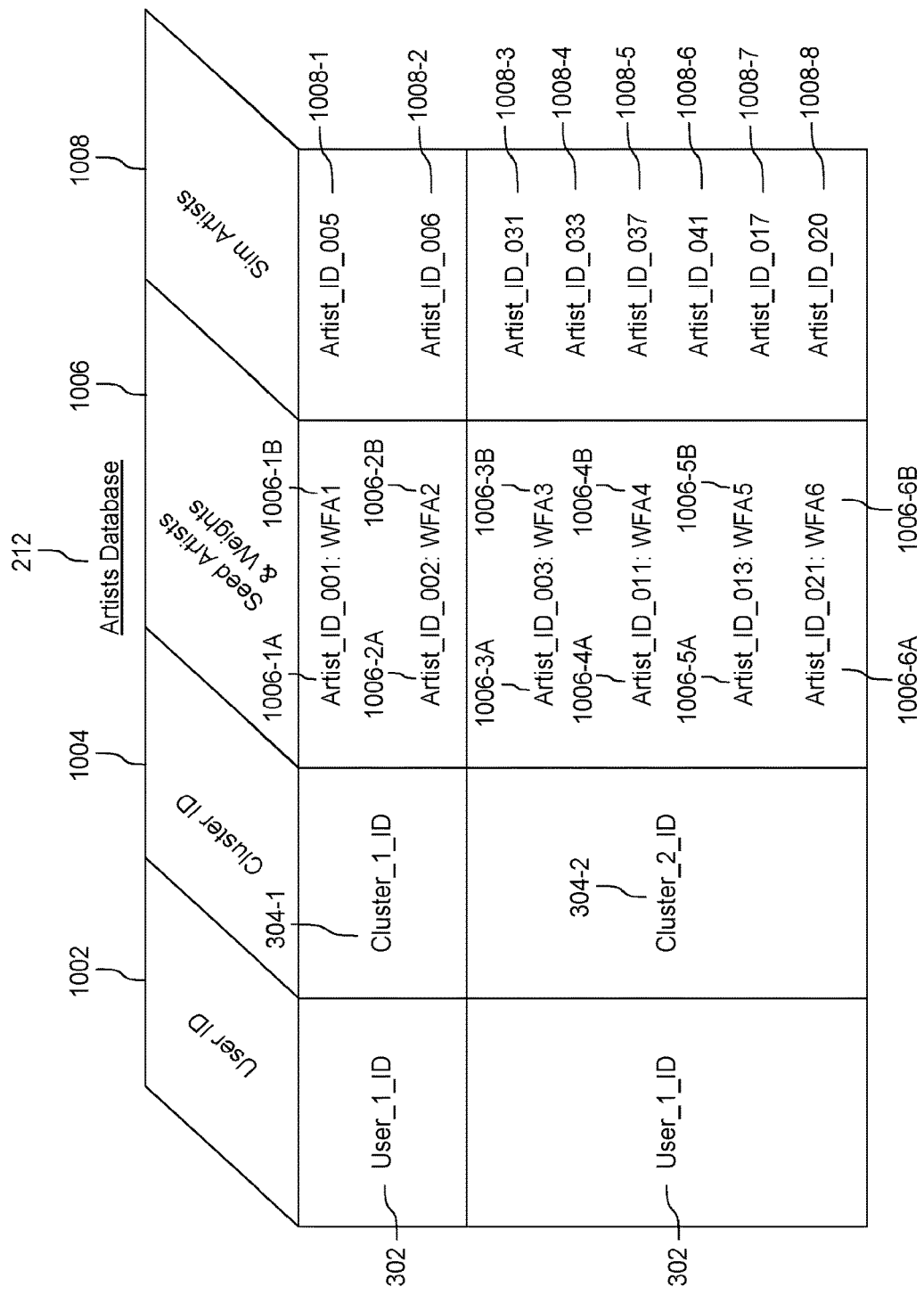
FIG. 12 is an illustration of the contents of an artists database.

As shown in FIG. 12, the artist database 212 stores at least four fields: user ID information 1002, cluster ID information 1004, seed artist ID and weighting information 1006, and similar artists ID information 1008. As discussed above, a user may have more than one cluster associated with their account. In FIG. 12, cluster IDs 304-1 and 304-2 are shown associated with user ID 302. For cluster ID 304-1, the artist database 212 stores a map of seed artist IDs (1006-1A & 1006-2A) and respectively corresponding weights (1006-1B & 1006-2B). For cluster ID 304-2, the artist database stores a map of seed artist IDs (1006-3A . . . 1006-6A) and respectively corresponding weights (1006-3B . . . 1006-6B). The artist database 212 also stores a list of sim artist IDs 1008-1 & 1008-2 (corresponding to cluster 1) and 1008-3 . . . 1008-8 (corresponding to cluster 2).

Returning to FIG. 11, in S904, the TPRP 202 loads the seed artist ID and weighting information 1006 and the similar artists ID information 1008 corresponding to user ID 302 and cluster ID(s) 304-1 & 304-2 into memory 202*a*. Next, in S906, the TPRP 202 calculates the median weight of all seed artists that do not have a zero weight. Next, in S908, the TPRP 202 assigns the calculated median weight to each seed artist that does have a zero weight. The TPRP 202 also weights and ranks the sim artists (identified by the sim artists ID information 1008) with respect to each other. Accordingly, if there are 8 sim artists, then one sim artist will be assigned a weight of "8" and ranked first, another sim artist will be assigned a weight of "1" and ranked last, and all other sim artists will fall in between. This weighting and ranking step is performed in S910.

Returning to FIG. 6, after the artist details have been loaded (S410), the TPRP 202 proceeds to calculate the most recent discovery track (S412). Tracks in the streaming content library may be categorized into one of three groups for each user: (I) a familiar track, (II) an unfamiliar track, by a familiar artist, or (III) an unfamiliar track, by an unfamiliar artist. Group I is consider a familiar track type, because the user is familiar with those tracks. Hence the tracks therein are labelled familiar tracks. Groups II and III are considered discovery track type, because the user is unfamiliar with the tracks therein. Hence, those tracks are labelled discovery tracks.

The TPRP 202, in one embodiment, picks a discovery track type to be played every M to N positions on the playlist, where M and N are integers. For example, the discovery track may be played every 5 to 7 positions. This helps to ensure that users are frequently presented with new content so that their listening experience does not become stale. When a request for a new playlist is received, however, it is necessary to calculate when the last discovery track was played (S412). This process is illustrated in detail in FIG. 13.

Figure 13:
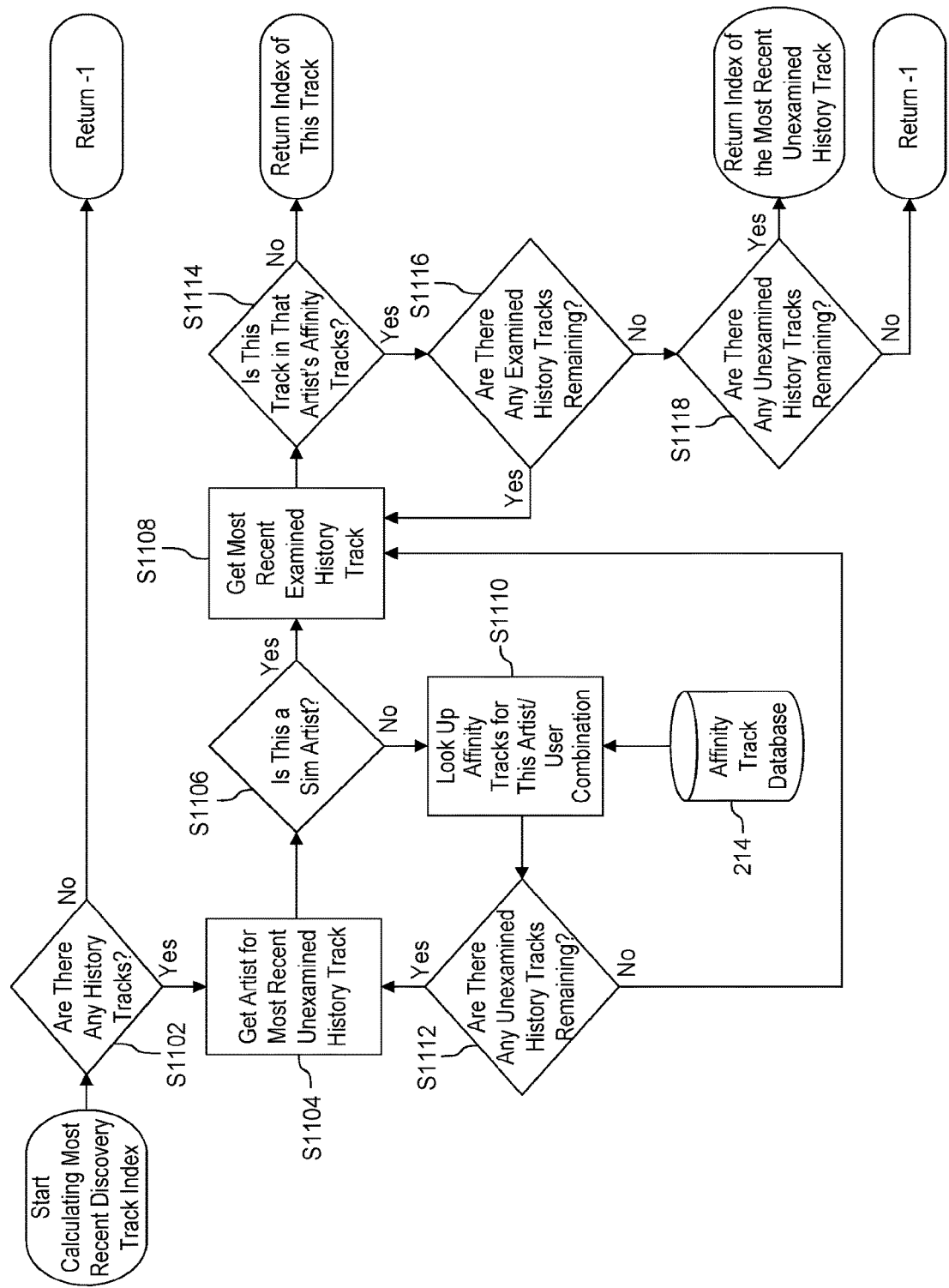
FIG. 13 is a flowchart illustrating the steps in calculating the value of the most recent discovery track index.

In general, the process in FIG. 13 shows how the TPRP 202 iterates through the history tracks from most recently played to least recently played looking for a track by a sim artist and records the tracks by seed artists as it goes to memory 202*a*, until it finds a track from a sim artist (which is also recorded to memory). A track by a seed artist may or may not be a discovery track. Thus, for each track by a seed artist in the list of history tracks, the TPRP 202 performs a check to determine whether the track is a discovery track. The result of the process shown in FIG. 13 is a value for the most recent discovery track index ($I_{LDT}$).

As shown in FIG. 13, the TPRP 202 initially determines whether the user request 201 contains history information. Specifically, whether the parameters contained in the user request 201 include one or more history track IDs (303-1 . . . 303-*n*) (S1102). If no history information 303 was included in the user request 201, then the TPRP 202 returns a value of "−1" for $I_{LDT}$. If, however, the TPRP 202 determines that the user request 201 included history information, then the process proceeds to S1104.

In S1104, the TPRP 202 determines the artist of the most recently played track which has not already been examined (i.e., on the first iteration a history track index $I_{HT}$=1). As shown in FIG. 4, user request 201 includes a history track ID 303-1 ("TRACK_ID_3212") for $I_{HT}$=1. TPRP 202 uses the history track ID to pull the corresponding artist ID, which was loaded into memory 202*a* in S804. In this case, the corresponding artist ID is "Artist_ID_003". The TPRP 202 then determines whether the artist is a seed artist based on whether the artist ID is stored as a seed artist or sim artist in the artist database 212 (S1106). If the TPRP 202 determines that the artist for the most recently played history track is a sim artist, then the process proceeds to S1108. The track is not recorded as an examined history track in memory 202*a*. If, however, the TPRP 202 determines that the artist is not a sim artist, then process proceeds to S1110. Here, in FIG. 4 "TRACK_ID_3212" corresponds to ARTIST_ID_003, which is a seed artist associated with cluster 2, as shown in FIG. 12.

Figure 14:
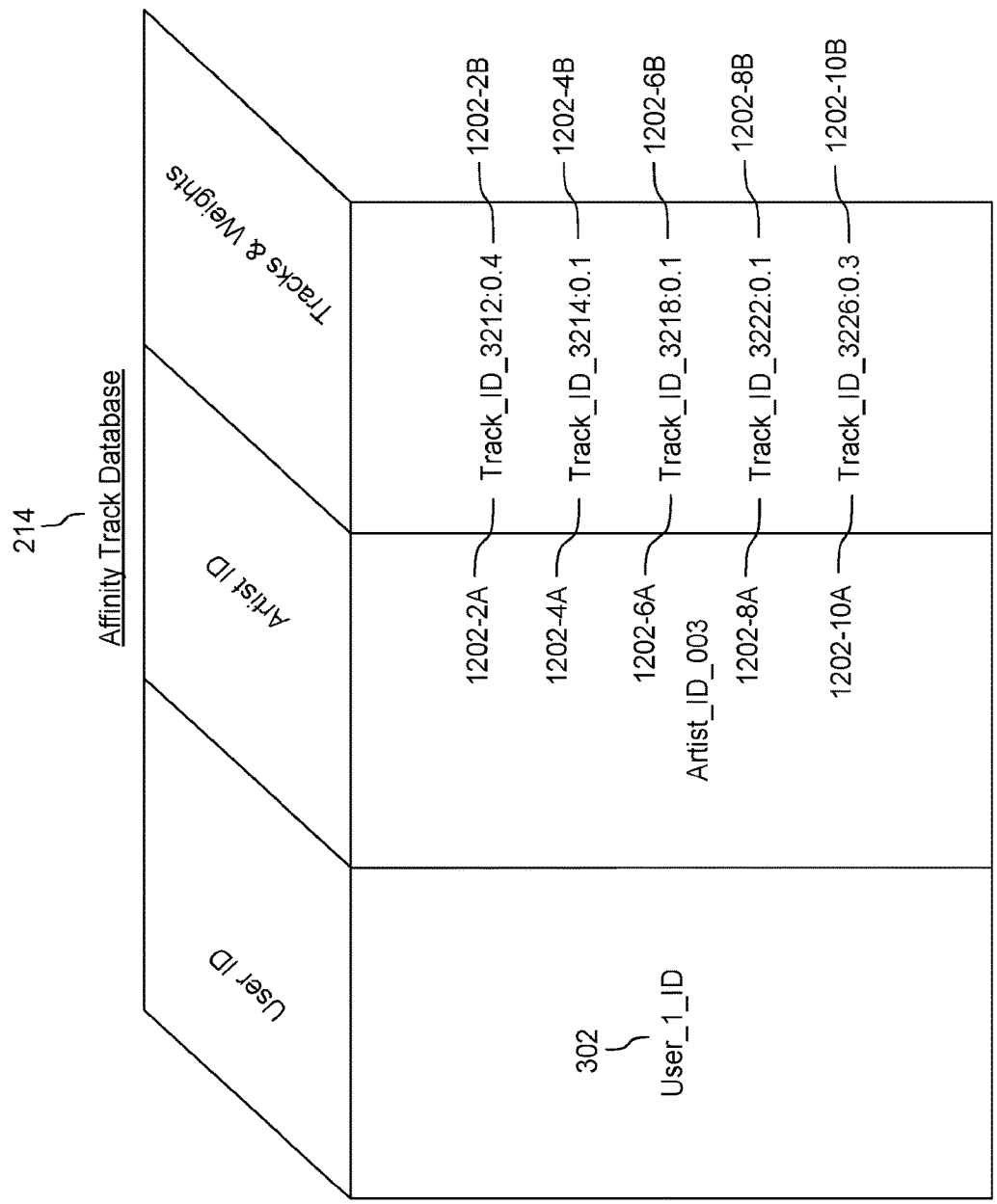
FIG. 14 is an illustration of the contents of an affinity track database.

In S1110, the TPRP 202 loads affinity tracks based on the user ID 302 and the seed artist ID, (e.g., ARTIST_ID_003). In one embodiment, the affinity tracks may be determined by on play history information for a prescribed time period, e.g., six months. Tracks which are played more frequently may have a higher weight than those played less frequently. Since the current history track is not by a sim artist, the track must therefore be by a seed artist. For each seed artist there exists a set of affinity tracks for that artist and corresponding weights which are stored in the affinity track database 214. FIG. 14 illustrates an exemplary affinity track database 214 which contains three fields: user ID, artist ID, and tracks and weights. As shown in FIG. 14, a set of affinity tracks identified by their track IDs 1202-2*a* . . . 1202-10*a* and respective weights 1202-2*b* . . . 1202-10*b* are stored in the artists database 214. The TPRP 202 loads the tracks IDs (1202-2*a* . . . 1202-10*a*) and their respective weights (1202-2*b* . . . 1202-10*b*) into memory 202*a* in S1110.

Figure 15:
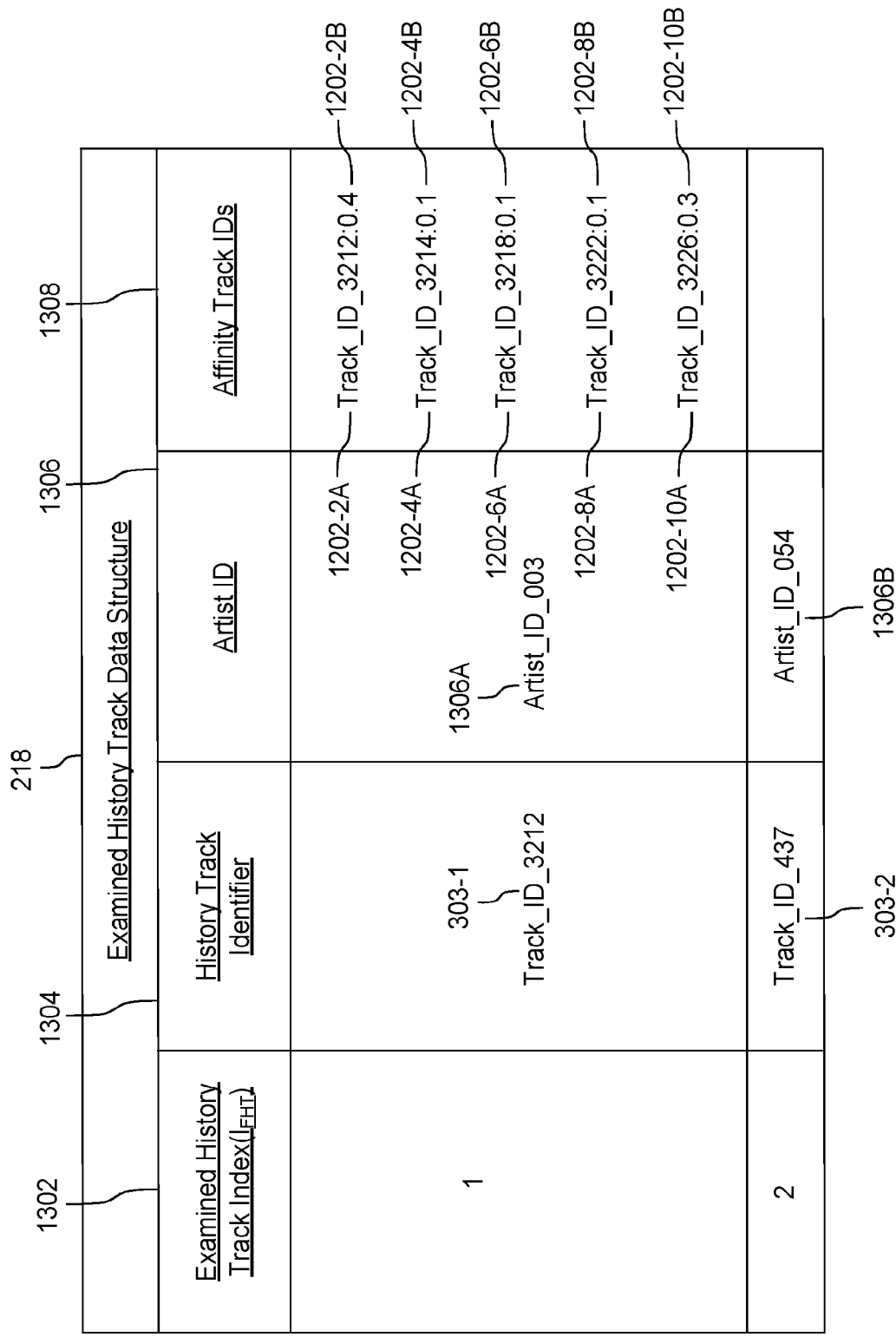
FIG. 15 is an illustration of the contents of an examined history track data structure.

For purposes of calculating the most recent discovery track index, memory 202*a* may include an examined history track data structure that includes the following fields: an examined history index 1302 ($I_{EHT}$), and track ID information 1304. Artist ID information 1306, in one embodiment, may also be included. For convenience, these fields are illustrated in FIG. 15. Since TRACK_ID_3212 was most recently played and is by a seed artist, the record corresponding to $I_{EHT}$=1 is populated with TRACK_ID_3212 and, optionally, ARTIST_ID_003.

The process then proceeds to S1112, where the TPRP 202 determines whether there are any unexamined history tracks remaining. If so, the process returns to S1104 and the next most recent history track is examined, as described above. If there are no unexamined history tracks remaining, however, then the process proceeds to S1108.

In S1108, the TPRP 202 determines whether the most recent examined history track ($I_{EHT}$=1) is listed in the affinity track IDs 1202 for the corresponding artist (the affinity tracks having been loaded in S1110). If so, then the track is not a discovery track, and the process proceeds to S1116. If, however, the TPRP 202 determines that the most recent examined history track is not listed in the affinity track IDs 1202, then the track is a discovery track. The history track index ($I_{HT}$) for that track is converted into the most recent discovery track index $I_{LDT}$ using the formula $I_{LDT}$=n−$I_{HT}$ where n is the highest $I_{HT}$ value given in the user request 303-*n* and stored in memory 202*a*. Here, in the example of FIG. 4, TRACK_ID_3212 is listed in the artist's affinity tracks (see FIG. 14) and is therefore not a discovery track. If, however, instead of TRACK_ID_3212, the first track history was TRACK_ID_3223 (also by ARTIST_ID_003), the result would be different. TRACK_ID_3223 is not listed in the artist's affinity tracks. As such, TRACK_ID_3223 is a discovery track, even though it is associated with a seed artist. As a result, the process would end at S1114 and the TPRP 202 would calculate the most recent discovery track index $I_{LDT}$ (as described above) using $I_{HT}$=1.

S1116 is only reached if the examined history track is not a discovery track. In S1116 the TPRP 202 determines whether there are any examined history tracks remaining in the examined history track data structure. If so, the process returns to S1108 and the next most recent examined history track ($I_{EHT}$=2) is analyzed. Here, in the example of FIG. 4, the next track TRACK_ID_437 may be by a seed artist 1306*b* which does not have affinity tracks. Thus, the TPRP 202 would convert the history track index ($I_{HT}$) value of 2 into the value n−2 as described in S1108 and assign that value to the most recent discovery track index $I_{LDT}$.

Since the examined history track data structure will continue to be populated with tracks until one of the tracks is determined to be by a sim artist, steps S1108, S1114, and S1116 may be repeated several times. If, however, all the tracks in the examined history track data structure have been analyzed and none are discovery tracks, then the process will proceed to S1118 where the TPRP 202 will determine if there are any unexamined history tracks remaining. If there are remaining unexamined history tracks then the history track index ($I_{HT}$) of the most recent unexamined history track will be converted into the most recent discovery track index $I_{LDT}$ as described for S1108. Otherwise, $I_{LDT}$ will be assigned a value of −1.

Returning to FIG. 6, by the process of S412 (described above), the TPRP 202 computes the most recent discovery track index $I_{LDT}$. This information is used to determine a track type for each track in the playlist to be generated, along with a corresponding artist (S416), the details of which are shown in FIGS. 16A and 16B.

Figure 16A:
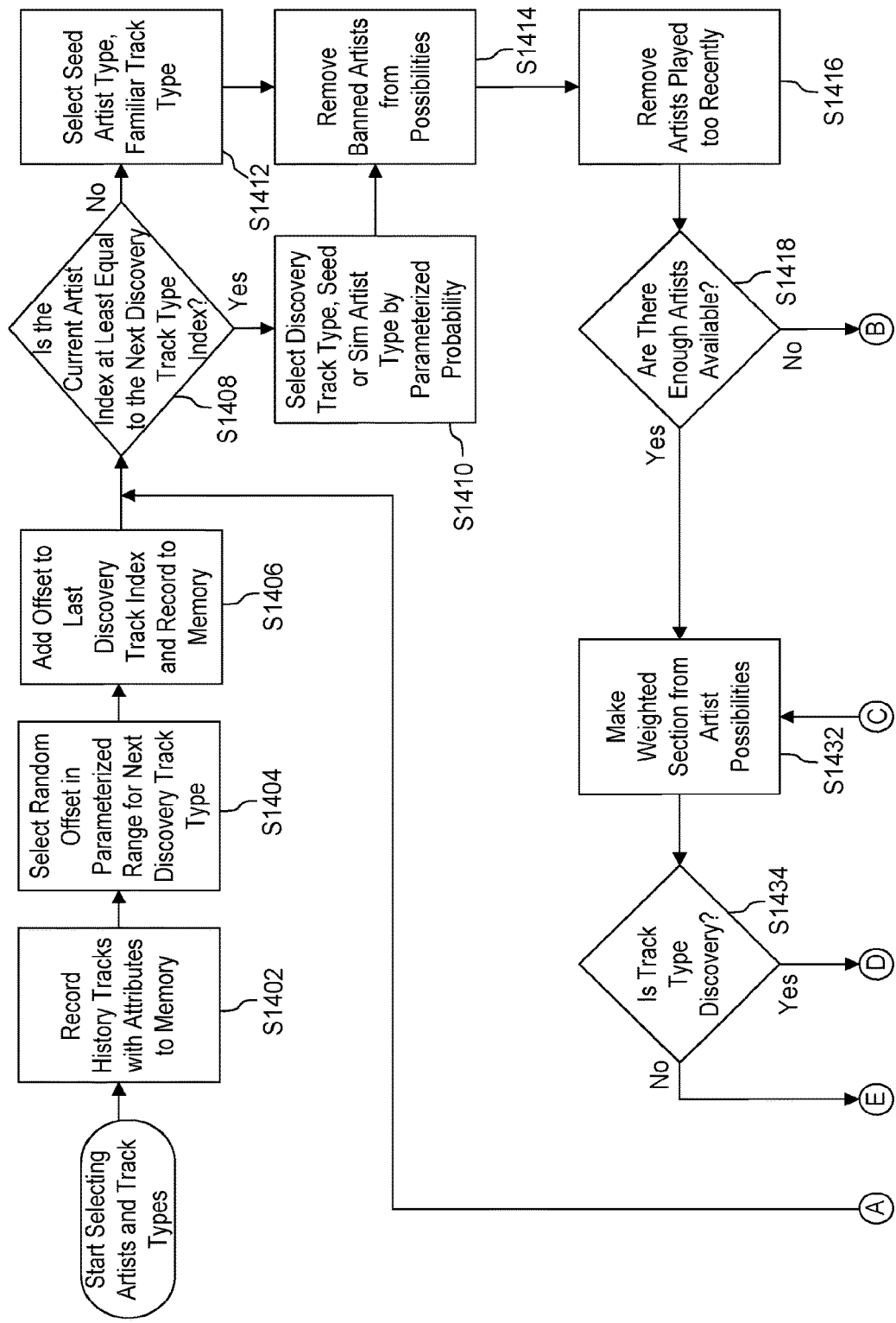
FIGS. 16A and 16B show a flowchart illustrating the steps in determining artist and track types for each position in a playlist.
Figure 16B:
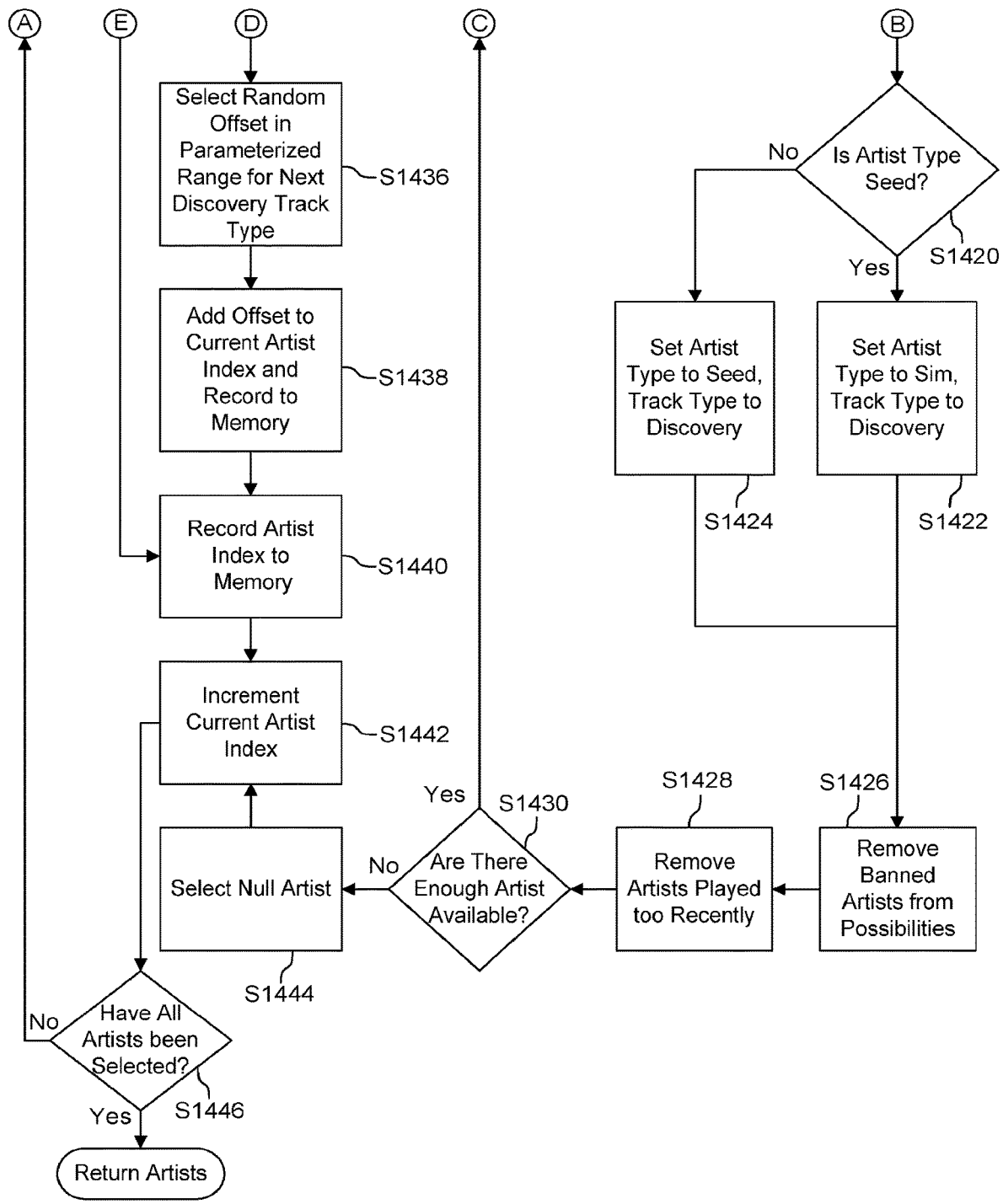

FIG. 16A illustrates a process for selecting artist and track types. In S1402, the TPRP 202 records the number of history tracks provided in the user request 201 as the current artist index ($I_{NA}$). The TPRP 202 also records, for each history track, the time that history track was last played to memory 202*a*. Next, in S1404, the TPRP 202 determines a random offset within the M to N range (discussed above). The TPRP 202 then adds the random offset to the most recent discovery track index $I_{LDT}$ to calculate the next discovery type track index $I_{NDT}$ (S1406).

Next, the TPRP 202 determines whether the current artist index $I_{NA}$ is at least equal to the next discovery type track index $I_{NDT}$ (S1408). If $I_{NA}$=$I_{NDT}$, then the TPRP 202 determines that the next track in the playlist should be a discovery type track (S1410). As discussed above, discovery tracks can be by sim artists or seed artists, and the TPRP 202 will randomly select between a sim artist type and seed artist type based on a configurable probability. For example, the probability of seed artist type may be 0.25 and the probability for sim artist type may be 0.75. If, however, the TPRP 202 determines that the current artist index $I_{NA}$ is not at least equal to the next discovery type track index $I_{NDT}$ (in S1408), then the TPRP 202 selects a seed artist type and a familiar track type (S1412).

Next, in S1414, the TPRP 202 removes any artists IDs from the list of possible artists (generated in S410) based on the ban information loaded in S406. More specifically, the TPRP 202 removes any artists from the list of possible artists if there is at least one ban information loaded such that the scope of the ban is artists, then all artists ID information loaded in S506 for the exemplary track contains only a single ID, and the artist ID information 704 loaded in S506 for the exemplary track is equal to the artist ID information for that artist as loaded from the seed artist ID information 1006 or sim artist ID information 1008 in S904. The TPRP 202 also removes any artists who have been played too frequently in S1416, i.e., within a certain number of tracks. More specifically, the TPRP 202 removes any artists from the list of possible artists for which the difference between the current artist index $I_{NA}$ and the most recent index for that artist $I_{ARTIST\ LAST\ PLAYED}$ is less than a predetermined number, for example 20. The TPRP 202 then, in S1418, determines whether there is a sufficient number of artists remaining on the list of possible artists, by comparing the number of artists remaining on the list of possible artists to a predetermined number. If the number of artists remaining on the list of possible artists exceeds the predetermined number, then the process proceeds to S1432. If not, however, the process proceeds to S1420.

In S1420, the TPRP 202 determines whether the artist type for the current artist index $I_{NA}$ is a seed artist type or sim artist type. If the artist type is set to seed artist type, then the TPRP 202 changes the artist type to sim artist type and the track type to discovery in S1422. If the artist type is set to sim artist type, then the TPRP 202 changes the artist type to seed artist type and the track type to discovery. These actions may increase the number of available artists. However, they may also add banned artists or artists that have been played too recently to the list of possible artists. Accordingly, in S1426 and S1428, banned artists and artists that were played too recently are removed from the list of possible artists (as described above in S1414 and S1416). The TPRP 202 then rechecks the list of possible artists to determine whether there are a sufficient number (S1430). If so, the process proceeds to S1432. If, however, there are not enough artists in the list of possible artists, then the TPRP 202 will select a null artist (S1440) for the current artist index $I_{NA}$, which is merely a placeholder for the situation in which there are an insufficient number of artists available. When the playlist is generated, this placeholder will be skipped over and will not be visible.

In S1432, the TPRP 202 makes a weighted selection from the list of possible artists. If the artist type is a seed artist, then the weights for the seed artists 1006 (e.g., 1006-1b . . . 1006-6b) are used for seed artists that do not have a zero weight, and the calculated median weight assigned in S908 is used for seed artists that do have a zero weight. If the artist type is a sim artist, then the weights assigned in S910 are used. Next, in S1434, the TPRP 202 determines whether the track type for the current artist index $I_{NA}$ is discovery or not. If the track type is discovery, then the process proceeds to S1436, where a new random offset is calculated within the range of M to N. The newly calculated offset is then added to the current artist index $I_{NA}$ and stored in memory 202a as the next discovery type track index $I_{NET}$ (S1438). The TPRP 202 also records the current artist index $I_{NA}$ to memory 202a and associates it with the selected artist. This allows the TPRP 202 to later recall the last time this artist was selected to determine, for a future selection, if the artist was played too recently. The current artist index $I_{NA}$ is then incremented by 1 (S1442) and the TPRP 202 checks whether all artists have been selected for the playlist (S1446). If not, the process returns to S1408 and the above process repeats. If all artists have been selected, then the TPRP 202 proceeds to S420.

Figure 17:
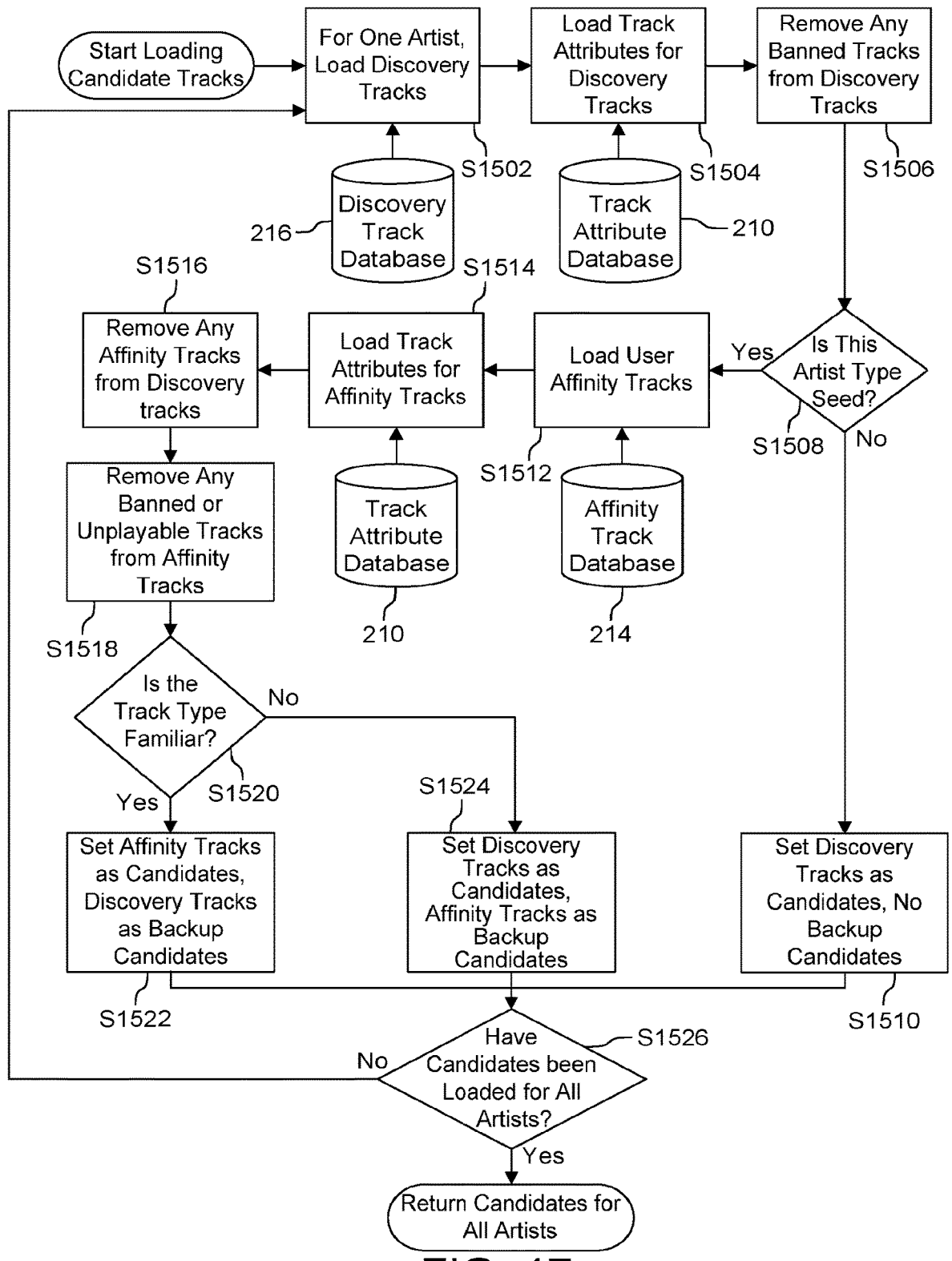
FIG. 17 is a flowchart illustrating the steps in loading candidate tracks for each of the positions in a playlist.

In S420, the TPRP 202 loads candidate tracks for all selected artists, as shown in further detail in FIG. 17. As described above, each index in the playlist has been populated with an artist (in the form of an artist ID), an artist type (seed artist type or sim artist type), and a track type (discovery or familiar). For each artist in the streaming library, a list of discovery tracks is stored in a discovery track database 216 with corresponding discovery track IDs. The TPRP 202 uses the user ID 302 and the artist ID for the artist assigned to that index in the playlist to load the discovery track IDs from the discovery track database 216 (S1502) into memory 202a. Next, in S1504, the TPRP 202 loads one or more track attributes from the track attribute database 210 for each of the discovery track IDs. In one embodiment, the TPRP 202 may preferably load for each discovery track ID the corresponding song ID information 712, all artist ID information 708, and title information 714 (S1504).

Next, in S1506, the TPRP 202 removes any banned tracks from the discovery tracks by comparing (i) the track ID 702, song ID information 712, and all artists ID information 708 for the discovery track IDs loaded into memory 202a in S1504 to (ii) the track ID information 702, song ID information 712, and all artists ID information 708 for the banned track IDs and exemplary track IDs for artist bans loaded into memory 202a in S406. More specifically, a track is banned if there is at least one ban information loaded such that the ban scope information 602 is a song and either the track ID information 702 of the track is equal to the track ID information 702 of the ban or the song ID information 712 of the track is equal to the song ID information 604 of the ban. A track is also banned if there is at least one ban information loaded such that the ban scope information 602 is artist and the all artists ID information 708 for the track contains all of the all artists ID information 708 for the exemplary track for that ban loaded in S506. That is, a track is also banned if its full set of artists is a superset of the full set of artists for any artist ban.

After the banned tracks have been removed from the list of discovery tracks, the TPRP 202 determines whether the artist type for this index in the playlist is a seed artist type (S1508). If the type is not a seed artist type (i.e., a sim artist type), then the process proceeds to S1510, where the list of discovery track IDs (loaded into memory 202a in S1502) is set as the candidate tracks for this index in the playlist, with no backup candidates. If, however, the TPRP 202 determines that the type is a seed artist type for the index in the playlist, then the TPRP 202 will proceed to load the user affinity tracks into memory 202a from the affinity track database 214 (S1512), along with the track attributes for the affinity tracks from the track attribute database 210 (S1514). Next, the TPRP 202 removes any affinity tracks from the list of discovery tracks generated in S1506 (S1516). Then, in S1518, the TPRP 202 removes any banned tracks from the list of affinity tracks as described for discovery tracks in S1506. Finally, also in S1518, the TPRP 202 removes any undesirable affinity tracks. An affinity track may for example be undesirable if its duration (710) is above 600000 milliseconds or below 60000 milliseconds, or if its categories (706) contain certain specified descriptive labels such as "karaoke" or "Children's".

At this point, there exist two lists of tracks in memory 202a: the list of discovery tracks generated in S1506, and the list of affinity tracks generated in S1518. The tracks on one of those lists will be designated as primary candidates, and the tracks on the other list will be designated as backup candidates, depending on whether the track type for the index in the playlist is familiar or discovery. If the TPRP 202 determines that the track type is familiar (S1520), then the affinity tracks are designated as primary candidates and the discovery tracks are designated as backup candidates (S1522). If, however, the TPRP 202 determines that the track type is discovery (S1520), then the discovery tracks are designated as primary candidates and the affinity tracks are designated as backup candidates (S1524).

Next, the TPRP 202 determines whether candidate tracks have been designated for each index in the playlist (S1526). If not, the process returns to S1502 and is repeated. If, however, candidate tracks have been designated for each index in the playlist, then the process proceeds to S422.

Figure 18:
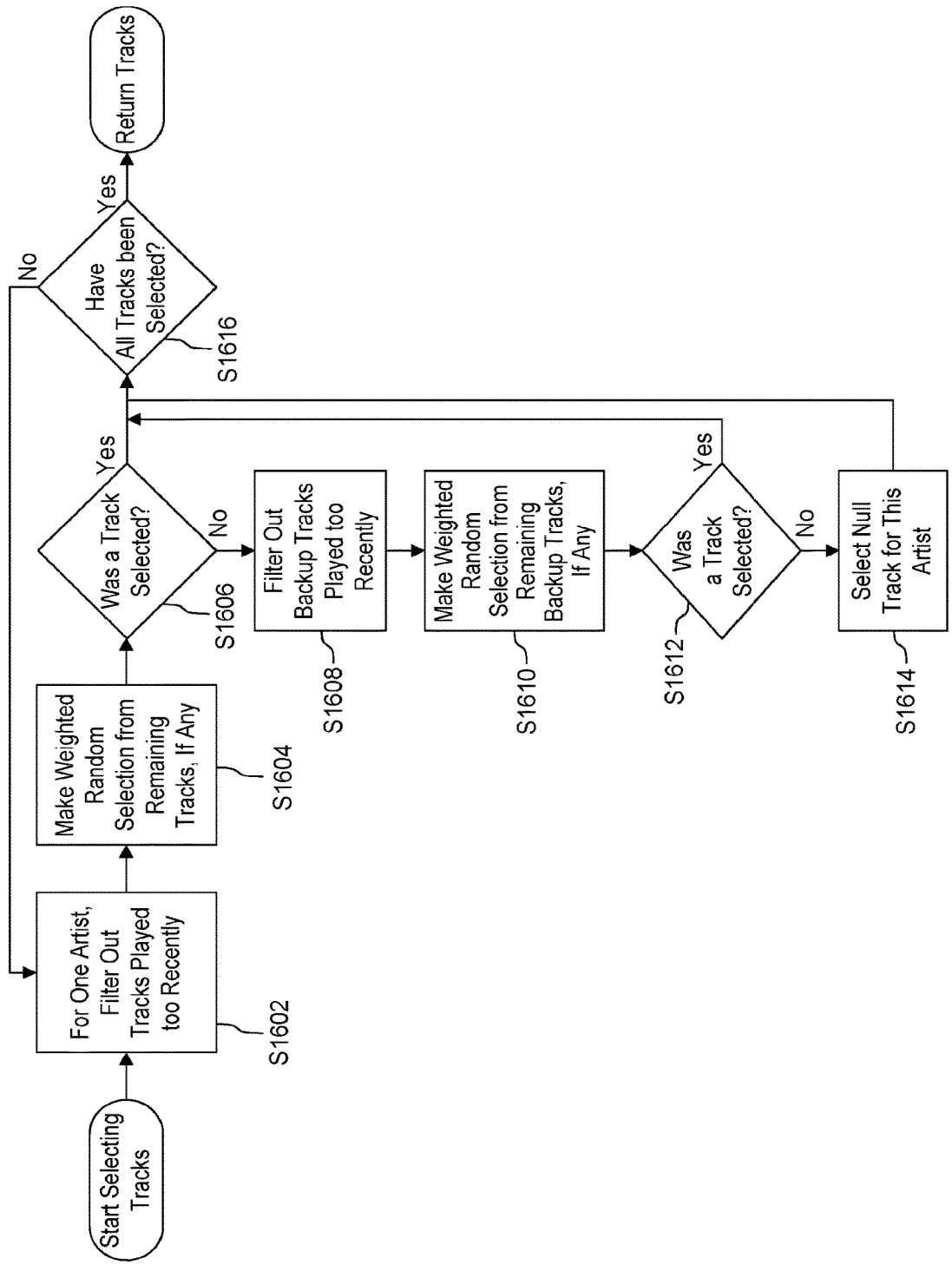
FIG. 18 is a flowchart illustrating the steps in selecting tracks for each of the positions in a playlist.

With the list of candidate tracks for each artist now obtained, the TPRP 202 (in S422) selects a track for each index value (position) in the playlist, the details of which are shown in FIG. 18. First, the TPRP 202 filters out tracks included in the list of candidate tracks that were played too recently, i.e., within a predetermined number of tracks from the current index (S1602). For example, any track played within 100 tracks of the current index value in the playlist could be excluded. Next, the TPRP 202 makes a weighted random selection from among the remaining candidate tracks, if any remain (S1604). The TPRP 202 then determines if a selection was made (S1606). If a selection was made, then the process proceeds to S1616. If no selection was made, then the process proceeds to S1608, where the TPRP 202 filters the list of backup candidates to remove any tracks that were played too recently, i.e., within the predetermined number of tracks from the current index. The TPRP 202 then makes a weighted random selection from the remaining backup tracks, if any remain (S1610). The TPRP 202 then determines whether a selection was made (S1612). If a selection was made, the process proceeds to S1616. If no selection was made, then the TPRP 202 selects a null track and the process proceeds to S1616. In S1616, the TPRP 202 determines whether a track has been selected for each index value (position) in the playlist. If not, the process returns to S1602. If so, then the playlist is now populated with a list of artists and tracks of both familiar and discovery types. The generated playlist is now provided to the client device 106 through the API 204.

Figure 19:
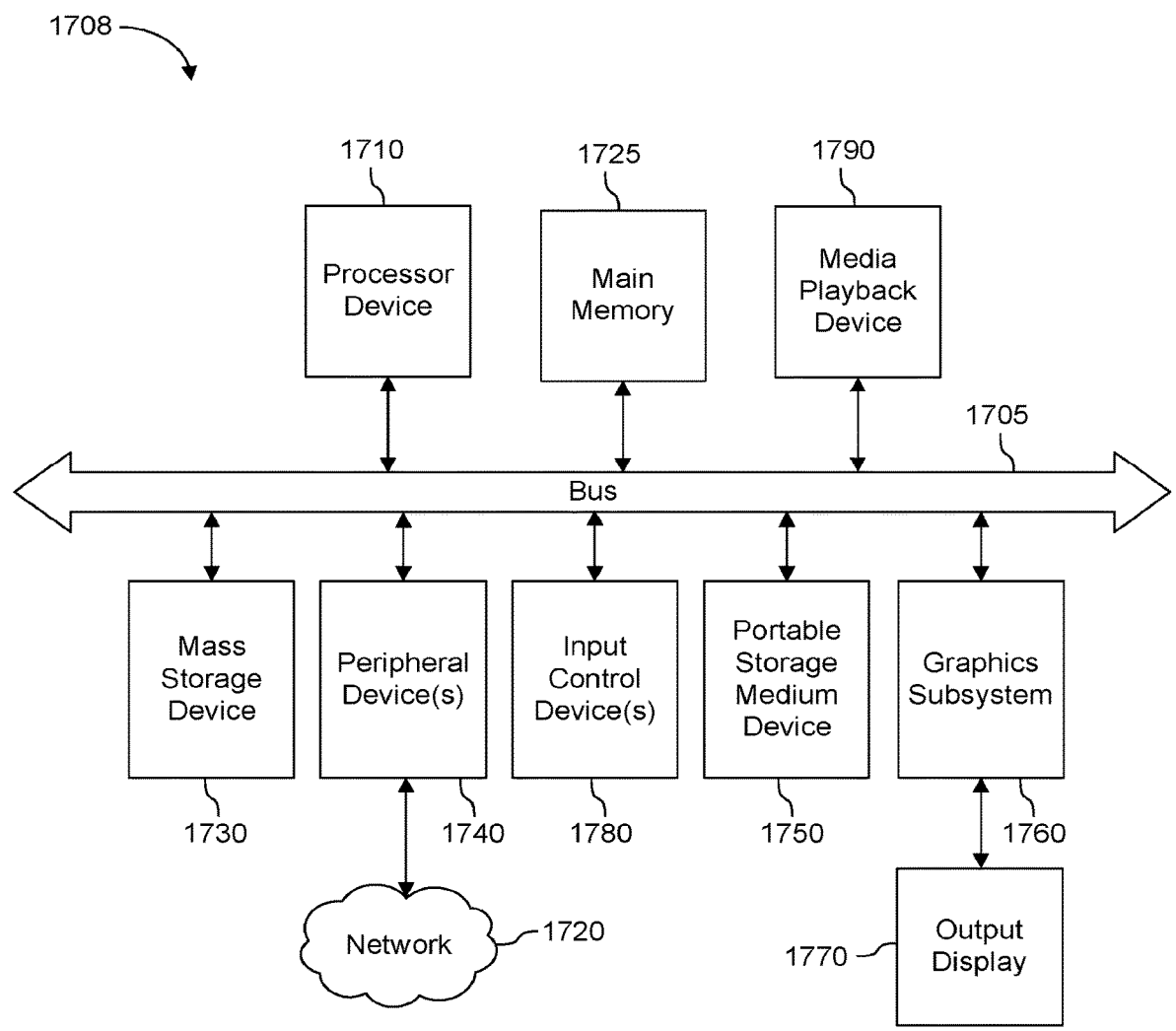
FIG. 19 is a block diagram of an exemplary computer system.

FIG. 19 is a block diagram showing an exemplary TPMRS 108 constructed to realize the functionality of the example embodiments described herein. Playlist generation, as described above, is fraught with technical hurdles due to the dichotomy between the vast content available to the user and the limited amount of information about the user. The embodiments described above are technical solutions to this computer-centric problem that enable improvement of the ability of TPMRS 108 to generate a playlist. Rather than being directed to the general idea of playlist generation, the above embodiments describe specific non-generic schemes for generating the playlist.

As discussed above, the TPMRS 108 includes the TPRP 202 which may be processor device 1710. Also included are a main memory 1725 and an interconnect bus 1705. The processor device 1710 may include without limitation a single microprocessor, or may include a plurality of microprocessors for configuring the TPMRS 108 as a multi-processor playlist generation system. The main memory 1725 stores, among other things, instructions and/or data for execution by the processor device 1710. The main memory 1725 may include banks of dynamic random access memory (DRAM), as well as cache memory.

The TPMRS 108 may further include a mass storage device 1730, peripheral device(s) 1740, portable non-transitory storage medium device(s) 1750, input control device(s) 1780, a graphics subsystem 1760, and/or an output display interface 1770. For explanatory purposes, all components in the TPMRS 108 are shown in FIG. 19 as being coupled via the bus 1705. However, the TPMRS 108 is not so limited. Elements of the TPMRS 108 may be coupled via one or more data transport means. For example, the processor device 1710, and/or the main memory 1725 may be coupled via a local microprocessor bus. The mass storage device 1730, peripheral device(s) 1740, portable storage medium device(s) 1750, and/or graphics subsystem 1760 may be coupled via one or more input/output (I/O) buses. The mass storage device 1730 may be a nonvolatile storage device for storing data and/or instructions for use by the processor device 1710. The mass storage device 1730 may be implemented, for example, with a magnetic disk drive or an optical disk drive. In a software embodiment, the mass storage device 1730 is configured for loading contents of the mass storage device 1730 into the main memory 1725. Memory 202a may be embodied as one or more of mass storage device 1730, main memory 1725, or portable storage medium device 1750.

Mass storage device 1730 may additionally store one or more of the databases discussed above. Such database, however, may also be connected to the TPMRS through the network connection 1720. Mass storage device 1730 may also include software that, when executed, causes the TPMRS 108 to perform the features described above.

The portable storage medium device 1750 operates in conjunction with a nonvolatile portable storage medium, such as, for example, a solid state drive (SSD), to input and output data and code to and from the TPMRS 108. In some embodiments, the software for storing information may be stored on a portable storage medium, and may be inputted into the TPMRS 108 via the portable storage medium device 1750. The peripheral device(s) 1740 may include any type of computer support device, such as, for example, an input/output (I/O) interface configured to add additional functionality to the TPMRS 108. For example, the peripheral device(s) 1740 may include a network interface card for interfacing the TPMRS 108 with a network 1720.

The input control device(s) 1780 provide a portion of an interface for the TPMRS 108. The input control device(s) 1780 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the TPMRS 108 may include the graphics subsystem 1760 and the output display 1770. The output display 1770 may include a display such as a CSTN (Color Super Twisted Nematic), TFT (Thin Film Transistor), TFD (Thin Film Diode), OLED (Organic Light-Emitting Diode), AMOLED display (Activematrix organic light-emitting diode), and/or liquid crystal display (LCD)-type displays. The displays can also be touchscreen displays, such as capacitive and resistive-type touchscreen displays.

The graphics subsystem 1760 receives textual and graphical information, and processes the information for output to the output display 1770.

Input control devices 1780 can control the operation and various functions of TPMRS 108.

Input control devices 1780 can include any components, circuitry, or logic operative to drive the functionality of TPMRS 108. For example, input control device(s) 1780 can include one or more processors acting under the control of an application.

Each component of the TPMRS 108 may represent a broad category of a computer component of a general and/or special purpose computer. Components of the TPMRS 108 are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for selecting a plurality of tracks, the method comprising the steps of:
   receiving, from a client device associated with a user, a plurality of request parameters;
   loading, from a database, based on the request parameters:
      a plurality of bans,
      a plurality of history track attributes, and
      a plurality of artist identifiers;
   calculating a most recent discovery track based on the plurality of history track attributes and the plurality of artist identifiers, wherein a discovery track is a history track that, based on play history information, has not been played back by the user;
   repeatedly selecting a selected artist identifier from the plurality of artist identifiers and a track type from a set of track types until a predetermined number of artist identifier and track type pairs have been selected;
   loading, from the database, a plurality of candidate tracks for each selected artist identifier;
   repeatedly selecting one track of the plurality of candidate tracks for each artist identifier and track type pair until one track has been selected for each pair of the predetermined number of artist identifier and track type pairs, wherein repeatedly selecting the one track of the plurality of candidate tracks further includes selecting a most recent unexamined history track as the most recent discovery track; and
   returning, to the client device, the predetermined number of tracks that have been selected.

2. The method of claim 1, further comprising the steps of:
   until a specified number of artists have been chosen:
      choosing an artist set, a track set type, and an artist from the artist set;
      excluding either (1) one or more artists that have been chosen within a specified number of tracks, or (2) one or more banned artists, or (3) a combination of both (1) and (2);
      wherein the artist set is determined based on a number of tracks selected since a last artist was selected from that artist set; and
   returning a list of chosen track sets.

3. The method of claim 2, wherein the artist set has at least one different bias from at least one bias of another artist set.

4. The method of claim 3, further comprising the step of: choosing the artist by either (1) a weight or (2) a descending rank.

5. The method claim 1, further comprising the steps of:
choosing a track from a target track set type, excluding tracks that either (1) have been chosen within a specified number of tracks, (2) share a title with a track chosen within a specified number of tracks, (3) have been previously banned, or (4) that are from a collaboration of artists that has been previously banned, or any combination of (1), (2), (3) or (4).

6. The method of claim 5, further comprising the steps of:
reverting to a non-target track set; and
skipping the artist if no track is available in any set.

7. The method of claim 6, further comprising the step of:
choosing the artist by either (1) a weight or (2) a descending rank.

8. A system for selecting a plurality of tracks, the system comprising at least one processor configured to:
receive, from a client device associated with a user, a plurality of request parameters;
load, from a database, based on the request parameters:
a plurality of bans,
a plurality of history track attributes, and
a plurality of artist identifiers;
calculate a most recent discovery track based on the plurality of histories and the plurality of artist identifiers, wherein a discovery track is a history track that, based on play history information, has not been played back by the user;
repeatedly select a selected artist identifier from the plurality of artist identifiers and a track type from a set of track types until a predetermined number of artist identifier and track type pairs have been selected;
load, from the database, a plurality of candidate tracks for each selected artist identifier;
repeatedly select one track of the plurality of candidate tracks for each artist identifier and track type pair until one track has been selected for each pair of the predetermined number of artist identifier and track type pairs, wherein the at least one processor being configured to repeatedly select the one track of the plurality of candidate tracks further includes the at least one processor being configured to select a most recent unexamined history track as the most recent discovery track; and
return, to the client device, the predetermined number of tracks that have been selected.

9. The system of claim 8, wherein the at least one processor is further configured to:
until a specified number of artists have been chosen:
choose an artist set, a track set type, and an artist from the artist set;
exclude either (1) one or more artists that have been chosen within a specified number of tracks, or (2) one or more banned artists, or (3) a combination of both (1) and wherein the artist set is determined based on a number of tracks selected since a last artist was selected from that artist set; and
return a list of chosen track sets.

10. The system of claim 9, wherein the artist set has at least one different bias from at least one bias of another artist set.

11. The system of claim 10, wherein the at least one processor is further configured to choose the artist by either (1) a weight or (2) a descending rank.

12. The system of claim 8, wherein the at least one processor is further configured to:
choose a track from a target track set type, excluding tracks that either (1) have been chosen within a specified number of tracks, (2) share a title with a track chosen within a specified number of tracks, (3) have been previously banned, or (4) that are from a collaboration of artists that has been previously banned, or any combination of (1), (2), (3) or (4).

13. The system of claim 12, wherein the at least one processor is further configured to:
revert to a non-target track set; and
skip the artist if no track is available in any set.

14. The system of claim 13, wherein the at least one processor is further configured to choose the artist by either (1) a weight or (2) a descending rank.

15. A non-transitory computer-readable storage medium having stored thereon one or more sequences of instructions for causing one or more processors to perform:
receiving, from a client device associated with a user, a plurality of request parameters;
loading, from a database, based on the request parameters:
a plurality of bans,
a plurality of history track attributes, and
a plurality of artist identifiers;
calculating a most recent discovery track based on the plurality of history track attributes and the plurality of artist identifiers, wherein a discovery track is a history track that, based on play history information, has not been played back by the user;
repeatedly selecting a selected artist identifier from the plurality of artist identifiers and a track type from a set of track types until a predetermined number of artist identifier and track type pairs have been selected;
loading, from the database, a plurality of candidate tracks for each selected artist identifier;
repeatedly selecting one track of the plurality of candidate tracks for each artist identifier and track type pair until one track has been selected for each pair of the predetermined number of artist identifier and track type pairs, wherein repeatedly selecting the one track of the plurality of candidate tracks further includes selecting a most recent unexamined history track as the most recent discovery track; and
returning, to the client device, the predetermined number of tracks that have been selected.

* * * * *